United States Patent
Collins et al.

(10) Patent No.: US 10,508,442 B2
(45) Date of Patent: Dec. 17, 2019

(54) FLOOR AND CEILING PANEL FOR SLAB-FREE FLOOR SYSTEM OF A BUILDING

(71) Applicant: Innovative Building Technologies, LLC, Seattle, WA (US)

(72) Inventors: Arlan Collins, Seattle, WA (US); Mark Woerman, Seattle, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 0 days.

(21) Appl. No.: 16/082,849

(22) PCT Filed: Mar. 7, 2017

(86) PCT No.: PCT/US2017/021168
§ 371 (c)(1),
(2) Date: Sep. 6, 2018

(87) PCT Pub. No.: WO2017/156006
PCT Pub. Date: Sep. 14, 2017

(65) Prior Publication Data
US 2019/0032332 A1  Jan. 31, 2019

Related U.S. Application Data

(60) Provisional application No. 62/304,857, filed on Mar. 7, 2016.

(51) Int. Cl.
*E04B 5/02* (2006.01)
*E04B 5/10* (2006.01)
(Continued)

(52) U.S. Cl.
CPC ............... *E04B 5/02* (2013.01); *E04B 5/023* (2013.01); *E04B 5/10* (2013.01); *E04B 5/48* (2013.01);
(Continued)

(58) Field of Classification Search
CPC ... E04B 5/48; E04B 5/02; E04B 5/023; E04B 5/10; E04C 2/52; E04C 2/521; F24D 3/14
See application file for complete search history.

(56) References Cited

U.S. PATENT DOCUMENTS

| | | |
|---|---|---|
| 1,168,556 A | 1/1916 | Robinson et al. |
| 1,501,288 A | 7/1924 | Morley |
| (Continued) | | |

FOREIGN PATENT DOCUMENTS

| | | |
|---|---|---|
| AU | 2005200682 | 5/2005 |
| AU | 201211472 | 2/2014 |
| (Continued) | | |

OTHER PUBLICATIONS

US 8,701,371 B2, 04/2014, Collins et al. (withdrawn)
(Continued)

*Primary Examiner* — Andrew J Triggs

(57) ABSTRACT

Floor and ceiling panels and methods of constructing a floor system for a building are described. In some embodiments, a panel includes a plurality of joists, a corrugated form deck disposed above and attached to the plurality of joists, a ceiling substrate disposed below and attached to the plurality of joists, and an in-floor radiant heat member disposed between the corrugated form deck and the ceiling substrate. In some embodiments, the panel includes a plurality of joists, a corrugated form deck disposed above and attached to the plurality of joists, and a sound dampener disposed between the corrugated form deck and the plurality of joists. In some embodiments, the method includes attaching a pre-assembled panel to a frame of the building and pouring concrete onto the panel so that a radiant heat member is separated from the concrete by a corrugated form deck of the panel.

38 Claims, 11 Drawing Sheets

(51) Int. Cl.
*E04C 2/52* (2006.01)
*E04B 5/48* (2006.01)
*F24D 3/14* (2006.01)

(52) U.S. Cl.
CPC .............. *E04C 2/52* (2013.01); *E04C 2/521* (2013.01); *F24D 3/14* (2013.01)

(56) References Cited

U.S. PATENT DOCUMENTS

| | | |
|---|---|---|
| 1,876,528 A | 7/1931 | Walters |
| 1,883,376 A | 10/1932 | George et al. |
| 2,160,161 A | 5/1939 | Marsh |
| 2,419,319 A | 4/1947 | Lankton |
| 2,495,862 A | 1/1950 | Osborn |
| 2,562,050 A | 7/1951 | Lankton |
| 2,686,420 A | 8/1954 | Youtz |
| 2,722,724 A | 11/1955 | Miller |
| 2,758,467 A | 8/1956 | Brown et al. |
| 2,871,544 A | 2/1959 | Youtz |
| 2,871,997 A | 2/1959 | Simpson et al. |
| 2,877,990 A | 3/1959 | Goemann |
| 2,946,413 A | 7/1960 | Weismann |
| 3,017,723 A | 1/1962 | Heidenstam |
| 3,052,449 A | 9/1962 | Long et al. |
| 3,053,015 A | 9/1962 | George |
| 3,053,509 A | 9/1962 | Haupt et al. |
| 3,065,575 A | 11/1962 | Ray |
| 3,079,652 A | 3/1963 | Wahlfeld |
| 3,184,893 A | 5/1965 | Booth |
| 3,221,454 A | 12/1965 | Giulio |
| 3,235,917 A | 2/1966 | Skubic |
| 3,236,014 A | 2/1966 | Edgar |
| 3,245,183 A | 4/1966 | Tessin |
| 3,281,172 A | 10/1966 | Kuehl |
| 3,315,424 A | 4/1967 | Smith |
| 3,355,853 A | 12/1967 | Wallace |
| 3,376,919 A | 4/1968 | Agostino |
| 3,388,512 A | 6/1968 | Newman |
| 3,392,497 A | 7/1968 | Vantine |
| 3,411,252 A | 11/1968 | Boyle, Jr. |
| 3,460,302 A | 8/1969 | Cooper |
| 3,490,191 A | 1/1970 | Ekblom |
| 3,568,380 A | 3/1971 | Stucky et al. |
| 3,579,935 A | 5/1971 | Regan et al. |
| 3,590,393 A | 7/1971 | Hollander |
| 3,594,965 A | 7/1971 | Saether |
| 3,604,174 A | 9/1971 | Nelson, Jr. |
| 3,608,258 A | 9/1971 | Spratt |
| 3,614,803 A | 10/1971 | Matthews |
| 3,638,380 A | 2/1972 | Perri |
| 3,707,165 A | 12/1972 | Stahl |
| 3,713,265 A | 1/1973 | Wysocki et al. |
| 3,721,056 A | 3/1973 | Toan |
| 3,722,169 A | 3/1973 | Boehmig |
| 3,727,753 A | 4/1973 | Starr |
| 3,742,666 A | 7/1973 | Antoniou |
| 3,750,366 A | 8/1973 | Rich, Jr. et al. |
| 3,751,864 A | 8/1973 | Berger et al. |
| 3,755,974 A | 9/1973 | Berman |
| 3,762,115 A | 10/1973 | McCaul, III |
| 3,766,574 A | 10/1973 | Smid, Jr. |
| 3,821,818 A | 7/1974 | Alosi |
| 3,823,520 A | 7/1974 | Ohta et al. |
| 3,845,601 A | 11/1974 | Kostecky |
| 3,853,452 A | 12/1974 | Delmonte |
| 3,885,367 A | 5/1975 | Thunberg |
| 3,906,686 A | 9/1975 | Dillon |
| 3,921,362 A | 11/1975 | Ortega |
| 3,926,486 A | 12/1975 | Sasnett |
| 3,971,605 A | 7/1976 | Sasnett |
| 3,974,618 A | 8/1976 | Cortina |
| 3,990,202 A | 11/1976 | Becker |
| 4,018,020 A | 4/1977 | Sauer et al. |
| 4,038,796 A | 8/1977 | Eckel |
| 4,050,215 A | 9/1977 | Fisher |
| 4,059,936 A * | 11/1977 | Lukens .............. E04B 7/22 52/764 |
| 4,065,905 A | 1/1978 | Lely et al. |
| 4,078,345 A | 3/1978 | Piazzalunga |
| 4,107,886 A | 8/1978 | Ray |
| 4,112,173 A | 9/1978 | Roudebush |
| 4,114,335 A | 9/1978 | Carroll |
| 4,142,255 A | 3/1979 | Togni |
| 4,161,087 A | 7/1979 | Levesque |
| 4,171,545 A | 10/1979 | Kann |
| 4,176,504 A | 12/1979 | Huggins |
| 4,178,343 A | 12/1979 | Rojo, Jr. |
| 4,205,719 A | 6/1980 | Norell et al. |
| 4,206,162 A | 6/1980 | Vanderklaauw |
| 4,214,413 A | 7/1980 | Gonzalez Espinosa de Los |
| 4,221,441 A | 9/1980 | Bain |
| 4,226,061 A | 10/1980 | Day, Jr. |
| 4,248,020 A | 2/1981 | Zielinski et al. |
| 4,251,974 A | 2/1981 | Vanderklaauw |
| 4,280,307 A | 7/1981 | Griffin |
| 4,314,430 A | 2/1982 | Farrington |
| 4,325,205 A | 4/1982 | Salim |
| 4,327,529 A | 5/1982 | Bigelow, Jr. |
| 4,341,052 A | 7/1982 | Douglass, Jr. |
| 4,361,994 A | 12/1982 | Carver |
| 4,389,831 A | 6/1983 | Baumann |
| 4,397,127 A | 8/1983 | Mieyal |
| 4,435,927 A | 3/1984 | Umezu |
| 4,441,286 A | 4/1984 | Skvaril |
| 4,447,987 A | 5/1984 | Lesosky |
| 4,447,996 A | 5/1984 | Maurer, Jr. |
| 4,477,934 A | 10/1984 | Salminen |
| 4,507,901 A | 4/1985 | Carroll |
| 4,513,545 A | 4/1985 | Hopkins, Jr. |
| 4,528,793 A | 7/1985 | Johnson |
| 4,531,336 A | 7/1985 | Gartner |
| 4,592,175 A | 6/1986 | Werner |
| 4,646,495 A | 3/1987 | Chalik |
| 4,648,228 A | 3/1987 | Kiselewski |
| 4,655,011 A | 4/1987 | Borges |
| 4,688,750 A | 8/1987 | Teague et al. |
| 4,712,352 A | 12/1987 | Low |
| 4,757,663 A | 7/1988 | Kuhr |
| 4,856,244 A | 8/1989 | Clapp |
| 4,862,663 A | 9/1989 | Krieger |
| 4,893,435 A | 1/1990 | Shalit |
| 4,910,932 A | 3/1990 | Honigman |
| 4,918,897 A | 4/1990 | Luedtke |
| 4,919,164 A | 4/1990 | Barenburg |
| 4,974,366 A | 12/1990 | Tizzoni |
| 4,991,368 A | 2/1991 | Amstutz |
| 5,009,043 A | 4/1991 | Kurrasch |
| 5,010,690 A | 4/1991 | Geoffrey |
| 5,036,638 A | 8/1991 | Kurtz, Jr. |
| 5,076,310 A | 12/1991 | Barenburg |
| 5,079,890 A | 1/1992 | Kubik et al. |
| 5,127,203 A | 7/1992 | Paquette |
| 5,154,029 A | 10/1992 | Sturgeon |
| 5,185,971 A | 2/1993 | Johnson, Jr. |
| 5,205,091 A | 4/1993 | Brown |
| 5,212,921 A | 5/1993 | Unruh |
| 5,228,254 A | 7/1993 | Honeycutt, Jr. |
| 5,233,810 A | 8/1993 | Jennings |
| 5,254,203 A | 10/1993 | Corston |
| 5,307,600 A | 5/1994 | Simon, Jr. |
| 5,359,820 A | 11/1994 | McKay |
| 5,361,556 A | 11/1994 | Menchetti |
| 5,402,612 A | 4/1995 | diGirolamo et al. |
| 5,412,913 A | 5/1995 | Daniels et al. |
| 5,426,894 A | 6/1995 | Headrick |
| 5,452,552 A | 9/1995 | Ting |
| 5,459,966 A | 10/1995 | Suarez |
| 5,471,804 A | 12/1995 | Winter, IV |
| 5,483,773 A | 1/1996 | Parisien |
| 5,493,838 A | 2/1996 | Ross |
| 5,509,242 A | 4/1996 | Rechsteiner et al. |
| 5,519,971 A | 5/1996 | Ramirez |
| 5,528,877 A | 6/1996 | Franklin |
| 5,584,142 A | 12/1996 | Spiess |

(56) References Cited

U.S. PATENT DOCUMENTS

| | | |
|---|---|---|
| 5,592,796 A | 1/1997 | Landers |
| 5,611,173 A | 3/1997 | Headrick et al. |
| 5,628,158 A | 5/1997 | Porter |
| 5,640,824 A | 6/1997 | Johnson |
| 5,660,017 A | 8/1997 | Houghton |
| 5,678,384 A | 10/1997 | Maze |
| 5,697,189 A | 12/1997 | Miller |
| 5,699,643 A | 12/1997 | Kinard |
| 5,706,607 A | 1/1998 | Frey |
| 5,724,773 A | 3/1998 | Hall |
| 5,746,034 A | 5/1998 | Luchetti et al. |
| 5,755,982 A | 5/1998 | Strickland |
| 5,850,686 A | 12/1998 | Mertes |
| 5,867,964 A | 2/1999 | Perrin |
| 5,870,867 A | 2/1999 | Mitchell |
| 5,921,041 A | 7/1999 | Egri, II |
| 5,970,680 A | 10/1999 | Powers |
| 5,987,841 A | 11/1999 | Campo |
| 5,992,109 A | 11/1999 | Jonker |
| 5,997,792 A | 12/1999 | Gordon |
| 6,000,194 A | 12/1999 | Nakamura |
| 6,055,787 A | 5/2000 | Gerhaher et al. |
| 6,073,401 A | 6/2000 | Iri et al. |
| 6,073,413 A | 6/2000 | Tongiatama |
| 6,076,319 A | 6/2000 | Hendershot |
| 6,086,350 A | 7/2000 | Del Monte |
| 6,154,774 A | 11/2000 | Furlong |
| 6,170,214 B1 | 1/2001 | Treister et al. |
| 6,240,704 B1 | 6/2001 | Porter |
| 6,243,993 B1 | 6/2001 | Swensson |
| 6,244,002 B1 | 6/2001 | Martin |
| 6,244,008 B1 | 6/2001 | Miller |
| 6,260,329 B1 | 7/2001 | Mills |
| 6,289,646 B1 | 9/2001 | Watanabe |
| 6,301,838 B1 | 10/2001 | Hall |
| 6,308,465 B1 | 10/2001 | Galloway et al. |
| 6,308,491 B1 | 10/2001 | Porter |
| 6,340,508 B1 | 1/2002 | Frommelt |
| 6,371,188 B1 | 4/2002 | Baczuk |
| 6,393,774 B1 | 5/2002 | Fisher |
| 6,421,968 B2 | 7/2002 | Degelsegger |
| 6,427,407 B1 | 8/2002 | Wilson |
| 6,430,883 B1 | 8/2002 | Paz et al. |
| 6,446,396 B1 | 9/2002 | Marangoni et al. |
| 6,481,172 B1 | 11/2002 | Porter |
| 6,484,460 B2 | 11/2002 | VanHaitsma |
| 6,625,937 B1 | 9/2003 | Parker |
| 6,651,393 B2 | 11/2003 | Don |
| 6,729,094 B1 | 5/2004 | Spencer et al. |
| 6,748,709 B1 | 6/2004 | Sherman et al. |
| 6,837,013 B2 | 1/2005 | Foderberg et al. |
| 6,922,960 B2 | 8/2005 | Sataka |
| 6,964,410 B1 | 11/2005 | Hansen |
| 7,007,343 B2 | 3/2006 | Weiland |
| 7,059,017 B1 | 6/2006 | Rosko |
| 7,143,555 B2 | 12/2006 | Miller |
| RE39,462 E | 1/2007 | Brady |
| 7,389,620 B1 | 6/2008 | McManus |
| 7,395,999 B2 | 7/2008 | Walpole |
| 7,444,793 B2 | 11/2008 | Raftery et al. |
| 7,467,469 B2 | 12/2008 | Wall |
| 7,484,329 B2 | 2/2009 | Fiehler |
| 7,484,339 B2 | 2/2009 | Fiehler |
| 7,493,729 B1 | 2/2009 | Semmes |
| 7,546,715 B2 * | 6/2009 | Roen ................... E04B 5/10 52/126.5 |
| 7,574,837 B2 | 8/2009 | Hagen, Jr. et al. |
| 7,658,045 B2 | 2/2010 | Elliott et al. |
| 7,676,998 B2 | 3/2010 | Lessard |
| 7,694,462 B2 | 4/2010 | O'Callaghan |
| 7,721,491 B2 | 5/2010 | Appel |
| 7,748,193 B2 | 7/2010 | Knigge et al. |
| 7,908,810 B2 | 3/2011 | Payne, Jr. et al. |
| 7,921,965 B1 | 4/2011 | Surace |
| 7,966,778 B2 | 6/2011 | Klein |
| 8,051,623 B2 | 11/2011 | Loyd |
| 8,096,084 B2 | 1/2012 | Studebaker et al. |
| 8,109,058 B2 | 2/2012 | Miller |
| 8,127,507 B1 | 3/2012 | Bilge |
| 8,166,716 B2 | 5/2012 | Macdonald et al. |
| 8,234,827 B1 | 8/2012 | Schroeder, Sr. |
| 8,234,833 B2 | 8/2012 | Miller |
| 8,251,175 B1 | 8/2012 | Englert et al. |
| 8,276,328 B2 | 10/2012 | Pépin |
| 8,322,086 B2 | 12/2012 | Weber |
| 8,359,808 B2 | 1/2013 | Stephens, Jr. |
| 8,424,251 B2 | 4/2013 | Tinianov |
| 8,490,349 B2 | 7/2013 | Lutzner |
| 8,505,259 B1 | 8/2013 | Degtyarev |
| 8,539,732 B2 | 9/2013 | Leahy |
| 8,555,581 B2 | 10/2013 | Amend |
| 8,555,589 B2 | 10/2013 | Semmens et al. |
| 8,555,598 B2 | 10/2013 | Wagner et al. |
| 8,621,806 B2 | 1/2014 | Studebaker et al. |
| 8,621,818 B1 | 1/2014 | Glenn et al. |
| 8,631,616 B2 | 1/2014 | Carrion et al. |
| 8,733,046 B2 | 5/2014 | Naidoo |
| 8,769,891 B2 | 7/2014 | Kelly |
| 8,826,613 B1 * | 9/2014 | Chrien ................... E04B 5/48 52/127.2 |
| 8,833,025 B2 | 9/2014 | Krause |
| 8,950,132 B2 | 2/2015 | Collins et al. |
| 8,966,845 B1 | 3/2015 | Ciuperca |
| 8,978,324 B2 | 3/2015 | Collins et al. |
| 8,991,111 B1 * | 3/2015 | Harkins ................... E04B 5/48 52/169.11 |
| 8,997,424 B1 | 4/2015 | Miller |
| 9,027,307 B2 | 5/2015 | Collins et al. |
| 9,382,709 B2 | 7/2016 | Collins et al. |
| 9,683,361 B2 | 6/2017 | Timberlake et al. |
| 10,041,289 B2 | 8/2018 | Collins et al. |
| 2002/0059763 A1 | 5/2002 | Wong |
| 2002/0092703 A1 | 7/2002 | Gelin et al. |
| 2002/0134036 A1 * | 9/2002 | Daudet ................... E04B 5/10 52/289 |
| 2002/0170243 A1 | 11/2002 | Don |
| 2003/0005653 A1 | 1/2003 | Sataka |
| 2003/0056445 A1 | 3/2003 | Cox |
| 2003/0084629 A1 | 5/2003 | Strickland et al. |
| 2003/0101680 A1 | 6/2003 | Lee |
| 2003/0140571 A1 | 7/2003 | Muha et al. |
| 2003/0167712 A1 | 9/2003 | Robertson |
| 2003/0167719 A1 | 9/2003 | Alderman |
| 2003/0200706 A1 | 10/2003 | Kahan et al. |
| 2003/0221381 A1 | 12/2003 | Ting |
| 2004/0065036 A1 | 4/2004 | Capozzo |
| 2004/0103596 A1 | 6/2004 | Don |
| 2005/0081484 A1 | 4/2005 | Yland |
| 2005/0108957 A1 | 5/2005 | Quesada |
| 2005/0188626 A1 | 9/2005 | Johnson |
| 2005/0188632 A1 | 9/2005 | Rosen |
| 2005/0198919 A1 | 9/2005 | Hester, Jr. |
| 2005/0204697 A1 | 9/2005 | Rue |
| 2005/0204699 A1 | 9/2005 | Rue |
| 2005/0210764 A1 | 9/2005 | Foucher et al. |
| 2005/0210798 A1 | 9/2005 | Burg et al. |
| 2005/0235571 A1 | 10/2005 | Ewing et al. |
| 2005/0235581 A1 | 10/2005 | Cohen |
| 2005/0247013 A1 | 11/2005 | Walpole |
| 2005/0262771 A1 | 12/2005 | Gorman |
| 2006/0021289 A1 | 2/2006 | Elmer |
| 2006/0070321 A1 | 4/2006 | Au |
| 2006/0090326 A1 * | 5/2006 | Corbett ................... F24D 3/142 29/527.1 |
| 2006/0096202 A1 | 5/2006 | Delzotto |
| 2006/0117689 A1 | 6/2006 | Onken et al. |
| 2006/0137293 A1 | 6/2006 | Klein |
| 2006/0143856 A1 | 7/2006 | Rosko et al. |
| 2006/0150521 A1 | 7/2006 | Henry |
| 2006/0179764 A1 | 8/2006 | Ito |
| 2006/0248825 A1 | 11/2006 | Garringer |
| 2007/0000198 A1 | 1/2007 | Payne |
| 2007/0074464 A1 | 4/2007 | Eldridge |
| 2007/0107349 A1 | 5/2007 | Erker |

(56) References Cited

U.S. PATENT DOCUMENTS

| | | |
|---|---|---|
| 2007/0157539 A1 | 7/2007 | Knigge et al. |
| 2007/0163197 A1 | 7/2007 | Payne et al. |
| 2007/0209306 A1 | 9/2007 | Andrews et al. |
| 2007/0234657 A1 | 10/2007 | Speyer et al. |
| 2007/0283640 A1 | 12/2007 | Shivak et al. |
| 2007/0294954 A1 | 12/2007 | Barrett |
| 2008/0000177 A1 | 1/2008 | Siu |
| 2008/0057290 A1 | 3/2008 | Guevara et al. |
| 2008/0098676 A1 | 5/2008 | Hutchens |
| 2008/0099283 A1 | 5/2008 | Reigwein |
| 2008/0104901 A1 | 5/2008 | Olvera |
| 2008/0168741 A1 | 7/2008 | Gilgan |
| 2008/0178542 A1 | 7/2008 | Williams |
| 2008/0178642 A1 | 7/2008 | Sanders |
| 2008/0202048 A1 | 8/2008 | Miller et al. |
| 2008/0222981 A1 | 9/2008 | Gobbi |
| 2008/0229669 A1 | 9/2008 | Abdollahzadeh et al. |
| 2008/0245007 A1 | 9/2008 | McDonald |
| 2008/0282626 A1 | 11/2008 | Powers, Jr. |
| 2008/0289265 A1 | 11/2008 | Lessard |
| 2008/0295450 A1 | 12/2008 | Yogev |
| 2009/0031652 A1 | 2/2009 | Ortega Gatalan |
| 2009/0038764 A1 | 2/2009 | Pilz |
| 2009/0064611 A1* | 3/2009 | Hall .................. E04B 5/10 52/236.9 |
| 2009/0077916 A1 | 3/2009 | Scuderi et al. |
| 2009/0090074 A1 | 4/2009 | Klein |
| 2009/0100760 A1 | 4/2009 | Ewing |
| 2009/0100769 A1 | 4/2009 | Barrett |
| 2009/0107065 A1 | 4/2009 | LeBlang |
| 2009/0113820 A1 | 5/2009 | Deans |
| 2009/0134287 A1 | 5/2009 | Klosowski |
| 2009/0165399 A1 | 7/2009 | Campos Gines |
| 2009/0188192 A1 | 7/2009 | Studebaker et al. |
| 2009/0188193 A1 | 7/2009 | Studebaker et al. |
| 2009/0205277 A1 | 8/2009 | Gibson |
| 2009/0249714 A1 | 10/2009 | Combs et al. |
| 2009/0277122 A1* | 11/2009 | Howery, Jr. ............. E04B 1/08 52/696 |
| 2009/0282766 A1* | 11/2009 | Roen .................. E04B 5/10 52/506.08 |
| 2009/0293395 A1 | 12/2009 | Porter |
| 2009/0313931 A1 | 12/2009 | Porter |
| 2010/0050556 A1 | 3/2010 | Bums |
| 2010/0064590 A1 | 3/2010 | Jones et al. |
| 2010/0064601 A1 | 3/2010 | Napier |
| 2010/0146874 A1 | 6/2010 | Brown |
| 2010/0186313 A1 | 7/2010 | Stanford et al. |
| 2010/0212255 A1 | 8/2010 | Lesoine |
| 2010/0218443 A1 | 9/2010 | Studebaker |
| 2010/0229472 A1 | 9/2010 | Malpas |
| 2010/0235206 A1 | 9/2010 | Miller et al. |
| 2010/0263308 A1 | 10/2010 | Olvera |
| 2010/0275544 A1 | 11/2010 | Studebaker et al. |
| 2010/0325971 A1 | 12/2010 | Leahy |
| 2010/0325989 A1 | 12/2010 | Leahy |
| 2011/0023381 A1 | 2/2011 | Weber |
| 2011/0041411 A1 | 2/2011 | Aragon |
| 2011/0056147 A1 | 3/2011 | Beaudet |
| 2011/0113709 A1 | 5/2011 | Pilz |
| 2011/0113715 A1 | 5/2011 | Tonyan et al. |
| 2011/0126484 A1 | 6/2011 | Carrion et al. |
| 2011/0154766 A1 | 6/2011 | Kralic et al. |
| 2011/0162167 A1 | 7/2011 | Blais |
| 2011/0219720 A1 | 9/2011 | Strickland et al. |
| 2011/0247281 A1 | 10/2011 | Pilz et al. |
| 2011/0268916 A1 | 11/2011 | Pardue, Jr. |
| 2011/0296769 A1 | 12/2011 | Collins et al. |
| 2011/0296778 A1 | 12/2011 | Collins et al. |
| 2011/0296789 A1 | 12/2011 | Collins et al. |
| 2011/0300386 A1 | 12/2011 | Pardue, Jr. |
| 2012/0151869 A1 | 6/2012 | Miller |
| 2012/0167505 A1 | 7/2012 | Krause |
| 2012/0186174 A1 | 7/2012 | LeBlang |
| 2012/0210658 A1 | 8/2012 | Logan |
| 2012/0297712 A1 | 11/2012 | Lutzner et al. |
| 2012/0317923 A1 | 12/2012 | Herdt et al. |
| 2013/0025222 A1 | 1/2013 | Mueller |
| 2013/0025966 A1 | 1/2013 | Nam et al. |
| 2013/0036688 A1 | 2/2013 | Gosain |
| 2013/0067832 A1 | 3/2013 | Collins et al. |
| 2013/0111840 A1 | 5/2013 | Bordener |
| 2013/0133277 A1 | 5/2013 | Lewis |
| 2013/0232887 A1 | 9/2013 | Donnini |
| 2014/0013678 A1 | 1/2014 | Deverini |
| 2014/0013684 A1 | 1/2014 | Kelly |
| 2014/0013695 A1 | 1/2014 | Wolynski et al. |
| 2014/0047780 A1 | 2/2014 | Quinn et al. |
| 2014/0059960 A1 | 3/2014 | Cole |
| 2014/0069035 A1 | 3/2014 | Collins |
| 2014/0069040 A1 | 3/2014 | Gibson |
| 2014/0069050 A1 | 3/2014 | Bolin |
| 2014/0083046 A1 | 3/2014 | Yang |
| 2014/0090323 A1 | 4/2014 | Glancy |
| 2014/0130441 A1 | 5/2014 | Sugihara et al. |
| 2014/0317841 A1 | 10/2014 | DeJesus et al. |
| 2015/0007415 A1 | 1/2015 | Kalinowski |
| 2015/0096251 A1 | 4/2015 | McCandless et al. |
| 2015/0136361 A1 | 5/2015 | Gregory |
| 2015/0152634 A1 | 6/2015 | Unger |
| 2015/0211227 A1 | 7/2015 | Collins et al. |
| 2015/0233108 A1 | 8/2015 | Eggleston, II et al. |
| 2015/0252558 A1 | 9/2015 | Chin |
| 2015/0284950 A1 | 10/2015 | Stramandinoli |
| 2016/0053475 A1 | 2/2016 | Locker et al. |
| 2016/0122996 A1 | 5/2016 | Timberlake et al. |
| 2016/0145933 A1 | 5/2016 | Condon et al. |
| 2016/0290030 A1 | 10/2016 | Collins et al. |
| 2016/0319534 A1 | 11/2016 | Bernardo |
| 2017/0284095 A1 | 10/2017 | Collins et al. |
| 2017/0299198 A1* | 10/2017 | Collins .................. E04C 2/50 |
| 2017/0306624 A1 | 10/2017 | Graham et al. |
| 2017/0306625 A1 | 10/2017 | Collins et al. |
| 2018/0038103 A1 | 2/2018 | Neumayr |
| 2018/0209136 A1 | 7/2018 | Aylward et al. |
| 2018/0328056 A1 | 11/2018 | Collins et al. |
| 2019/0032332 A1* | 1/2019 | Collins .................. E04B 5/02 |
| 2019/0032327 A1 | 3/2019 | Musson |

FOREIGN PATENT DOCUMENTS

| | | |
|---|---|---|
| AU | 2012211472 | 2/2014 |
| CN | 02137279 | 3/2008 |
| CN | 20137279 | 3/2008 |
| CN | 101821462 | 9/2010 |
| CN | 101831963 | 9/2010 |
| CN | 102459775 | 5/2012 |
| CN | 102587693 | 7/2012 |
| CN | 202299241 | 7/2012 |
| CN | 202391078 | 8/2012 |
| CN | 102733511 | 10/2012 |
| DE | 4205812 | 9/1993 |
| DE | 9419429 | 2/1995 |
| DE | 20002775 | 8/2000 |
| DE | 19918153 | 11/2000 |
| DE | 20315506 | 11/2004 |
| DE | 202008007139 | 10/2009 |
| EP | 1045078 | 10/2000 |
| EP | 0235029 | 2/2002 |
| EP | 1375804 | 1/2004 |
| EP | 2128353 | 12/2009 |
| EP | 2213808 | 8/2010 |
| EP | 2238872 | 10/2010 |
| EP | 1739246 | 1/2011 |
| EP | 2281964 | 2/2011 |
| EP | 3133220 | 2/2017 |
| FR | 1317681 | 5/1963 |
| FR | 2988749 | 10/2013 |
| FR | 2765906 | 1/2019 |
| GB | 898905 | 6/1962 |
| GB | 2481126 | 12/2011 |
| JP | 52-015934 | 4/1977 |
| JP | 53-000014 | 1/1978 |
| JP | 53-156364 | 12/1978 |

(56) References Cited

FOREIGN PATENT DOCUMENTS

| | | |
|---|---|---|
| JP | 54-084112 | 6/1979 |
| JP | 56-131749 | 10/1981 |
| JP | 57-158451 | 9/1982 |
| JP | 61-144151 | 9/1986 |
| JP | H0130985 | 1/1991 |
| JP | H0310985 | 1/1991 |
| JP | H049373 | 3/1992 |
| JP | 6-12178 | 2/1994 |
| JP | H0752887 | 12/1995 |
| JP | 8-189078 | 7/1996 |
| JP | 2576409 Y2 | 7/1998 |
| JP | 10234493 | 9/1998 |
| JP | H10245918 | 9/1998 |
| JP | 11-117429 | 4/1999 |
| JP | 2000-34801 | 2/2000 |
| JP | 2000144997 | 5/2000 |
| JP | 2000-160861 | 6/2000 |
| JP | 3137760 | 2/2001 |
| JP | 3257111 | 2/2002 |
| JP | 2002536615 | 10/2002 |
| JP | 2002364104 | 12/2002 |
| JP | 2003-505624 | 2/2003 |
| JP | 2003-278300 | 10/2003 |
| JP | 2004108031 | 4/2004 |
| JP | 3664280 | 6/2005 |
| JP | 2006-161406 | 6/2006 |
| JP | 3137760 | 12/2007 |
| JP | 2008073434 | 4/2008 |
| JP | 2008110104 | 5/2008 |
| JP | 2010245918 | 10/2010 |
| JP | 2011-032802 | 2/2011 |
| JP | 3187449 | 11/2013 |
| JP | 2015-117502 | 6/2015 |
| KR | 1019990052255 | 7/1999 |
| KR | 1019990053902 | 7/1999 |
| KR | 100236196 | 12/1999 |
| KR | 102000200413000 | 10/2000 |
| KR | 20060066931 | 6/2006 |
| KR | 20180092677 | 8/2018 |
| WO | 9107557 | 5/1991 |
| WO | 1991007557 | 5/1991 |
| WO | 1997022770 | 6/1997 |
| WO | 200046457 | 8/2000 |
| WO | 0058583 | 10/2000 |
| WO | 0235029 | 5/2002 |
| WO | 2002035029 | 5/2002 |
| WO | 2007059003 | 5/2007 |
| WO | 2007/080561 | 7/2007 |
| WO | 2010030060 | 3/2010 |
| WO | 2010037938 | 4/2010 |
| WO | 2015050502 | 4/2015 |
| WO | 2016/032537 | 3/2016 |
| WO | 2016/033429 | 3/2016 |
| WO | 2016032537 | 3/2016 |
| WO | 2016032538 | 3/2016 |
| WO | 2016032539 | 3/2016 |
| WO | 2016032540 | 3/2016 |
| WO | 2016033525 | 3/2016 |

OTHER PUBLICATIONS

USPTO, International Search Report for International Patent Application No. PCT/US2017/021168, dated May 19, 2017, 5 pages.
USPTO, Written Opinion for International Patent Application No. PCT/US2017/021168, dated May 19, 2017, 8 pages.
U.S. Appl. No. 12/796,603, filed Jun. 8, 2010, Collins et al.
European Search Report received for POT 14891125.8-1604/3011122 dated Jul. 8, 2016, 4 pages.
European Search Report in PCT/US2015/047383 dated Jun. 22, 2018, 10 Pages.
WIPO, International Search Report and Written opinion for International Application No. PCT/US/2014/053614 dated Dec. 18, 2014, 11 pages.
WIPO, International Search Report and Written opinion for International Application No. PCT/US/2014/053615 dated Dec. 17, 2014, 11 pages.
WIPO, International Search Report and Written opinion for International Application No. PCT/US/2014/053613 dated Dec. 18, 2014, 13 Pages.
WIPO, International Search Report and Written Opinion for International Application No. PCT/US2011/001039 dated Oct. 5, 2011, 14 Pages.
WIPO, International Search Report and Written opinion for International Application No. PCT/US2015/047383 dated Jan. 12, 2016, 14 Pages.
WIPO, International Search Report and Written opinion for International Application No. PCT/US15/47536 dated Dec. 4, 2015, 17 Pages.
WIPO, International Search Report and Written opinion for International Application No. PCT/US/2014/053616 dated Dec. 17, 2014, 9 Pages.
WIPO, International Search Report and Written Opinion for PCT Application No. PCT/US2011/001039 dated Oct. 5, 2011, 9 Pages.
"Beam to column connection", TATA Steel, http://www.tatasteelconstruction.com/en/reference/teaching_resources/architectural_studio_reference/elements/connections/beam to column connections, 2014, 4 Pages.
"Emerging Trends 2012 Executive Summary", Urban Land Institute, Ch. 1, 2011, 1-11 Pages.
"Emerging Trends in real estate", accessed on Sep. 15, 2016 at https://web.archive.orglweb120140813084823/http://pwc.corn.au/industry/real-estate/assets/Real-Estate-2012-Europe-Jan12.pdf, pp. 60, 2012.
"Extended European Search Report for European Application No. EP 15836516.3", dated Jun. 22, 2018, 1 page.
"Extended European Search Report for European Patent Application No. 14900469", dated Mar. 20, 2018, 1-8.
"How to Soundproof a Ceiling—Soundproofing Ceilings", http://www.soundproofingcompany.com/soundproofing-solutions/soundproof-a-ceiling/, Apr. 2, 2014, 1-7 Pages.
"Insulspan Installation Guide", Obtained at: http://www.insuispan.comidownloads:InstallationGuide,pdf on Feb. 2, 2016, 58 pages.
"Structural Insulated Panel", Wikipedia, http://www.en.wikipedia.org//wiki/Structural_insulated_panel, May 30, 2014, 5 Pages.
"Structural Insulated Panels", SIP Solutions, http://www.sipsolutions.com/content/structuralinsulated-panels, Aug. 15, 2014, 3 pages.
"US Apartment & Condominium Construction Forecast 2003-2017", Statista, Inc., Jun. 2012, 8 Pages.
Azari, et al., "Modular Prefabricated Residential Construction—Constraints and Opportunities", PNCCRE Technical Report #TR002, Aug. 2013, 90 Pages.
Borzouie, Jamaledin, et al., "Seismic Assesment and Reahbilitation of Diaphragms", http://www.nosazimadares.ir/behsazi/15WCEE2012/URM/1/Roof.pdf, Dec. 31, 2011, 86 Pages.
EPO, Communication Pursuant to Article 94(3) EPC mailed for EP application No. 15836516.3, dated Apr. 25, 2019, 4 pages.
Framecad, "FC EW 1-12mm Fibre Cement Sheet + 9mm MgO Board Wall Assembly", 2013, 2 pages.
Giles, et al., "Innovations in the Development of Industrially Designed and Manufactured Modular Concepts for Low-Energy, Multi-Story, High Density, Prefabricated Affordable Housing", Innovations in the Development of Industrially Designed and Manufactured Modular Concepts, 2006, 1-15 Pages.
Gonchar, "Paradigm Shift—Multistory Modular", Architectural Record, Oct. 2012, 144-148 Pages.
Kerin, et al., "National Apartment Market Report—2013", Marcus & Millichap, 2013, 1-9 pages.
M.A. Riusillo, "Lift Slab Construction: Its History, Methodology, Economics and Applications", ACI-Abstract, Jun. 1, 1988, 2 pages.
McIlwain, "Housing in America—The Next Decade", Urban Land Institute, 2010, 1-28 Pages.
McIlwain, "The Rental Boost From Green Design", Urban Land, http://urbanland.uli.org/sustainability/the-rental-boost-from-green-design/, Jan. 4, 2012, 1-6 Pages.

(56) References Cited

OTHER PUBLICATIONS

Shashaty, Andre, "Housing Demand", Sustainable Communities, Apr. 2011, 14-18 Pages.

Sichelman, "Severe Apartment Shortage Looms", Urban Land, http://urbanland.uli.org/capital-markets/nahb-orlando-severe-apartmentshortage-looms/, Jan. 13, 2011, 1-2 Pages.

Stiemer, S F, "Bolted Beam-Column Connections", http://faculty.philau.edu/pastorec/Tensile/bolted_beam_column_connections.pdf, Nov. 11, 2007, 1-16 Pages.

WIPO, International Search Report for International Patent Application No. PCT/US2017/021174, dated Jun. 26, 2017, 11 pages.

WIPO, Written Opinion for International Patent Application No. PCT/US2017/021174, dated Jun. 26, 2017, 6 pages.

WIPO, International Search Report for International Patent Application No. PCT/US2017/021179, dated May 25, 2017, 7 pages.

WIPO, Written Opinion for International Patent Application No. PCT/US2017/021179, dated May 25, 2017, 7 pages.

WIPO, International Search Report of International Patent Application No. PCT/US2017/021177, dated Jun. 5, 2017, 8 pages.

WIPO, Written Opinion of International Patent Application No. PCT/US2017/021177, dated Jun. 5, 2017, 8 pages.

WIPO, International Search Report and Written Opinion mailed for International application No. PCT/US2014/053614 dated Dec. 18, 2014, 11 pages.

WIPO, International Search Report and Written Opinion mailed for International application No. PCT/US2014/053615 dated Dec. 17, 2014, 11 Pages.

WIPO, International Search Report and Written Opinion mailed for International application No. PCT/US2014/053613 dated Dec. 18, 2014, 13 pages.

WIPO, International Search Report and Written Opinion mailed for International application No. PCT/US2015/047536 dated Dec. 4, 2015, 17 Pages.

WIPO, International Search Report and Written Opinion mailed for International application No. PCT/US2014/053616 dated Dec. 17, 2014, 9 Pages.

USPTO, International Search Report and Written Opinion for PCT Application No. PCT/US2019/38557, Sep. 4, 2019, 67 pages.

EPO, Communication Pursuant to Article 94(3) EPC for European Patent Application No. 15836516.3, Aug. 2, 2019, 4 pages.

WIPO, International Search Report and Written Opinion mailed for International application No. PCT/US2019/031370, Aug 7, 2019, 11 pages.

EPO, Extended European Search Report for European Patent Application No. 17763913.5, Oct. 16, 2019, 8 pages.

EPO, Partial European Search Report for European Patent Application No. 17763910.1, Oct. 17, 2019, 16 pages.

EPO, Extended European Search Report for European Patent Application No. 177639071, Sep. 13, 2019, 13 pages.

* cited by examiner

FLOOR AND CEILING PANEL FOR SLAB-FREE FLOOR SYSTEM OF A BUILDING

CROSS-REFERENCE TO RELATED APPLICATIONS

The present application is a U.S. National Stage filing under 35 U.S.C. § 371 of International Application No. PCT/US2017/021168, filed on Mar. 7, 2017, which claims priority under 35 U.S.C. § 119(e) to U.S. Provisional Application No. 62/304,857, filed on Mar. 7, 2016, both of which are incorporated by reference, in their entirety, for any purpose.

BACKGROUND

Conventional construction is conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns. One approach to improving efficiency in building construction may be modular construction. In the case of buildings with multiple dwelling units (e.g., apartments, hotels, student dorms, etc.), entire dwelling units (referred to as modules) may be built off-site in a factory and then trucked to the job site. The modules are then stacked and connected together, generally resulting in a low-rise construction (e.g., between one and six stories). Other modular construction techniques may involve the building of large components of the individual units off-site (e.g., in a factory) and assembling the large components in the field to reduce the overall construction effort at the job site and thereby reducing the overall time of erecting the building. However, shortcomings may exist with known modular building technologies and improvements thereof may be desirable.

SUMMARY

Techniques are generally described that include systems and methods relating to building construction and more specifically relating to constructing a floor system for a building.

An example system may include a pre-assembled floor and ceiling panel (also referred to as floor-ceiling panel) for use in buildings. The pre-assembled floor-ceiling panel may include a panel frame that includes a plurality of spaced apart joists disposed between and connected to first and second opposing end members, a ceiling panel disposed below and attached to the frame, and a floor panel disposed over and attached to the frame. The ceiling panel may include at least one pre-fabricated board of non-combustible material. The floor panel may include a plurality of stacked layers including a first layer disposed above and attached to the frame, a second layer disposed above and spaced apart from the first layer, wherein the first layer, the second layer, or both include one or more pre-fabricated boards of non-combustible material, and a shaped substrate between the first and second layers, the shaped substrate including a radiant heating member in a channel defined by an upper surface of the shaped substrate.

In some examples, the floor-ceiling panel may include a first mounting component attached to the panel frame. The first mounting component may be configured for joining adjacent floor-ceiling panels. In some examples, the first mounting component may include a first angle member (e.g., an angle iron) extending, at least partially, along a length of the frame. The angle member may have a generally L-shaped cross-section. In some examples, the first angle member may extend the full length of the frame. In some examples, the floor-ceiling panel may include a second mounting component attached to the panel frame. The second mounting component may be configured for joining the floor-ceiling panel to a structural frame of a building. In some examples, the second mounting component may include at least one bracket arranged vertically with respect to a horizontal member of the structural frame.

In some examples, the plurality of joists may include first and second outer joists and at least one inner joist disposed between the first and second outer joists. In some examples, the floor-ceiling panel may include a first angle member attached to one of the first and second outer joists and extending along a length of the joist. In some examples, the floor-ceiling panel may also include a second angle member attached to the same joist, the second angle member parallel with the first angle member. In some examples, the floor-ceiling panel may include an angle member attached to the other one of the first and second outer joists, which may be parallel with the first angle member. In some examples, the plurality of joists may be metal joists, such as steel joists. In some examples, the metal joists may have a C-shaped cross-section (e.g., steel C-joists).

In some examples, the ceiling panel may include two stacked layers of boards, such as fiberglass-clad boards, such as fiberglass-clad gypsum boards. In some examples, individual boards of the two layers may be staggered such that seams between boards of one of the two layers are offset from seams between boards of the other of the two layers. In some examples, the first layer of the floor panel may include metal-clad cement board. In some examples, the metal side of the first layer may be against the frame (e.g., facing the frame). In some examples, the second layer may include a non-combustible board, such as magnesium oxide board. In some examples, the shaped substrate may include an insulating core and a metal sheet bonded to the upper surface, the metal sheet following contours of the channel defined by the upper surface.

In some examples, the floor-ceiling panel may be configured to accommodate a pre-assembled wall structure along a perimeter portion of the floor-ceiling panel. In some examples, the first layer of the floor panel may be longer in length than the second layer, the shaped substrate, or both. In some examples, the shaped substrate and the second layer may be shorter than the first substrate to define a ledge for supporting a pre-assembled wall panel. In some examples, the first layer may be longer in width than the second layer and the shaped substrate. In some examples, the ceiling panel and at least one of the stacked layers of the floor panel may extend a full length of the joists.

In some examples, the floor-ceiling panel may include thermally insulative material between the floor and ceiling panels. In some examples, the floor-ceiling panel may include sound insulative material between the frame and each of the floor and ceiling panels. In some examples, the sound insulative material may include a plurality of sound strips lining flanges the joists. In some examples, the floor-ceiling panel may include a shower pan integrated into the floor panel.

An example building having at least five stories may include a structural frame including a horizontal beam, a pre-assembled floor-ceiling panel including a panel frame and disposed between two vertically adjacent stories of the building, and a first mounting component joined to the panel frame and connecting the pre-assembled floor-ceiling panel to the beam. The pre-assembled floor-ceiling panel may include a ceiling panel provided on a ceiling side of the floor-ceiling panel and defining a ceiling of one of the two vertically adjacent stories, a floor panel provided on a floor side of the floor-ceiling panel and defining a floor of the other one of the two vertically adjacent stories, and a radiant heating element provided within a depth of the floor panel, and the panel frame, which is disposed between and supporting the floor and ceiling panels, the panel frame including a plurality of joists that span a full length of a unit of the building. In some examples, the building may include a unit on one of the two vertically adjacent stories, and the unit may include a floor defined by three or fewer pre-assembled floor-ceiling panels. In some examples, the unit may also include two opposing walls spaced by a distance and each of the three or fewer pre-assembled floor-ceiling panels may span the distance between the two opposing walls. In some examples, one of the pre-assembled floor-ceiling panels of the unit may include a shower pan integrated into the floor panel. In some examples, one or more second mounting components may be provided along a longitudinal direction of each of the three or fewer pre-assembled floor-ceiling panels, the second mounting components joining adjacent floor-ceiling panels An example method may include attaching a first pre-assembled floor-ceiling panel to a structural frame of a building, joining a second pre-assembled floor-ceiling panel to the first pre-assembled floor-ceiling panel, and installing a floor finish material to the first and second pre-assembled floor-ceiling panels, wherein each of the first and second pre-assembled floor-ceiling panels includes a plurality of joists, a ceiling panel disposed below and attached to the plurality of joists, and a floor panel disposed above and attached to the plurality of joists, and wherein the floor panel includes a first floor layer disposed above and attached to the frame, a second floor layer over and spaced from the first floor layer, and a shaped substrate provided between the first and second floor layers, the shaped substrate including a channel and an in-floor radiant heat element received in the channel.

In some examples, attaching the first pre-assembled panel to the structural frame of the building may include placing the first pre-assembled floor-ceiling panel proximate a beam of the structural frame, and joining the first pre-assembled panel to the beam using an angle bracket arranged vertically with respect to the pre-assembled floor-ceiling panel and the beam. In some examples, attaching the first pre-assembled floor-ceiling panel to the structural frame may be performed before joining the second pre-assembled floor-ceiling panel to the first pre-assembled floor-ceiling panel.

In some examples, joining the second pre-assembled floor-ceiling panel to the first pre-assembled floor ceiling panel may include placing the second pre-assembled floor-ceiling panel next to the first pre-assembled floor-ceiling panel such that an outer joist of the first pre-assembled floor-ceiling panels is adjacent and spaced from an outer joist of the second pre-assembled floor-ceiling panel, and joining a first angle member of the first pre-assembled floor-ceiling panel to a second angle member of the second pre-assembled floor-ceiling panel to attach the second pre-assembled panel to the first pre-assembled panel. In some examples, the method may further include providing insulation in a cavity defined between the adjacent outer joists of the first and second pre-assembled floor-ceiling panels.

In some examples, installing the floor finish material may include attaching the floor finish material to the first and second pre-assembled floor-ceiling panels such that the floor finish material extends over a seam between the first and second pre-assembled floor-ceiling panels. In some examples, the method may further include installing a ceiling finish material to the first and second pre-assembled floor-ceiling panels such that the ceiling finish material extends over the seam between the first and second pre-assembled floor-ceiling panels.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
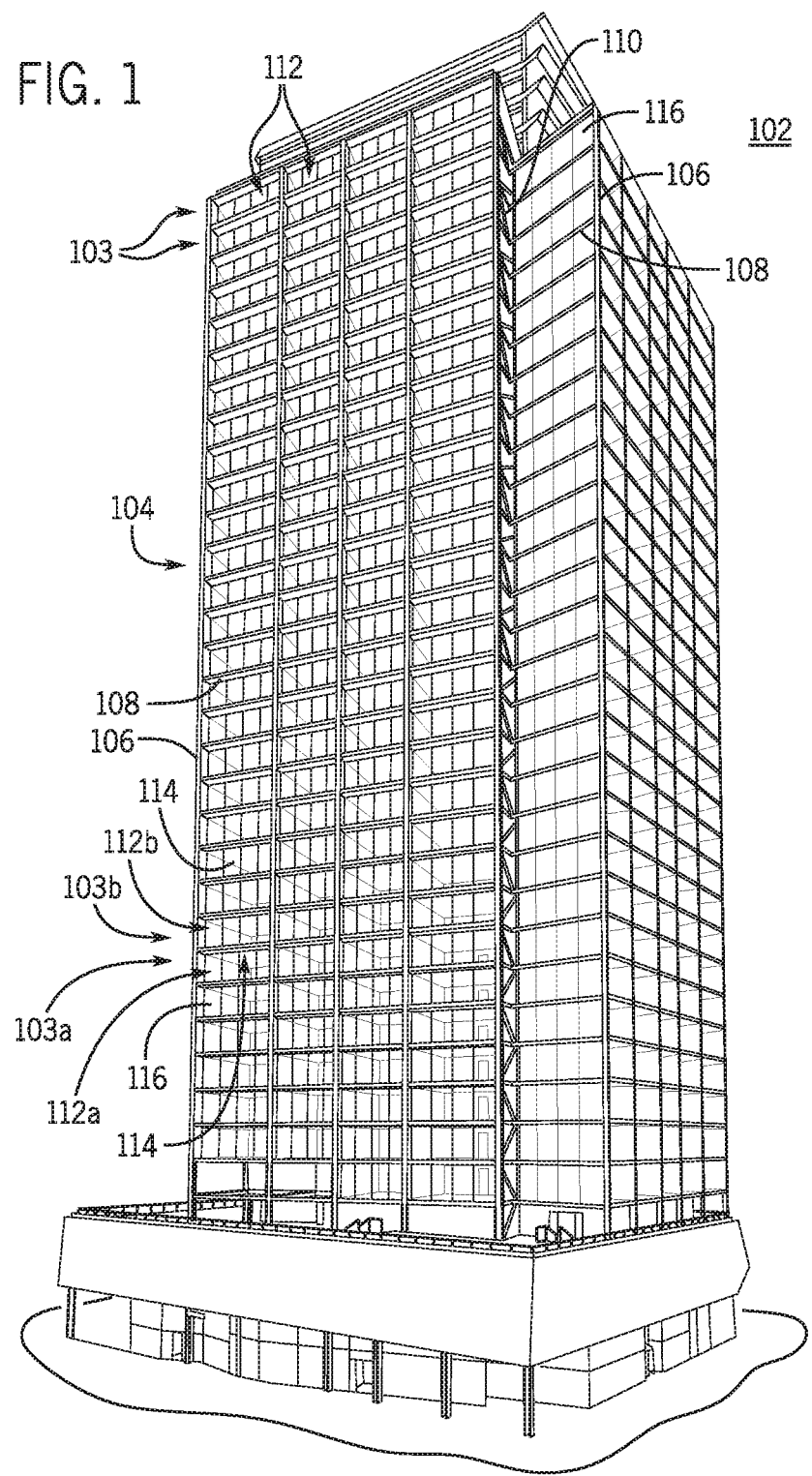
FIG. 1 is a schematic illustration of an example multi-story building.

all arranged in accordance with at least some examples of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatus generally related to a panel for use in a building. For example, the panel may be a pre-fabricated panel for use in modular building construction. In some examples, the panel may be assembled off-site in a shop and then transported to the building site. At the building site, the panel may be attached directly or indirectly to a building frame. The panel may define part of or the whole of a floor and part of or the whole of a ceiling in the building, such as part of or the whole of a floor and ceiling of a building unit. Thus, in some examples, the panel may interchangeably be referred to herein as a floor and ceiling panel, a floor-ceiling panel, or a floor ceiling sandwich (FCS) panel. The floor may be a portion of a story of the building above the panel, and the ceiling may be a portion of a story of the building below the panel.

The panel may include a frame, a floor panel, and a ceiling panel. The floor and ceiling panels may be vertically spaced from one another. The frame may separate the floor panel from the ceiling panel. The frame may include a plurality of joists positioned between the floor panel and the ceiling panel. The frame may define one or more joist cavities between adjacent joists. In some examples, the one or more joist cavities may accommodate plumbing, cabling, wiring, or other conduits or other elements that may support dwelling or commercial units in the buildings. An insulative material may be located in the one or more joist cavities. In some examples, cross members may be provided in or operatively arranged relative to the one or more joist cavities, for example for increasing the lateral stability of the panel. In some examples, the cross members may be implemented in the form of straps, such as metal straps, connected between opposite corners of a joist cavity. Sound dampener material (also referred to as sound insulative material) may be positioned between the frame, the floor panel, and the ceiling panel to reduce sound transmission through the floor and ceiling panel.

The floor panel may be attached to an upper side of the frame, also referred to as floor side of the frame. The floor panel may support a floor material (e.g., floor finish) of an upper story. The floor panel may be formed of one or more layers of non-combustible material and may include a radiant heating element, as will be further described below. The ceiling panel may be attached to a lower side of the frame, also referred to as ceiling side of the frame. The ceiling panel may support a ceiling material (e.g., a ceiling finish) of a lower story. The ceiling panel may be formed of one or more layers of non-combustible materials, as will be described below.

In some embodiments, the material composition of the floor and ceiling panel may be predominantly metal. In some embodiments it may be predominately aluminum. In still other embodiments, the panel components may be made from a variety of building suitable materials ranging from metals, to wood and wood polymer composites (WPC), wood based products (lignin), other organic building materials (bamboo) to organic polymers (plastics), to hybrid materials, or earthen materials such as ceramics. In some embodiments cement or other pourable or moldable building materials may also be used. In other embodiments, any combination of suitable building material may be combined by using one building material for some elements of the panel and other building materials for other elements of the panel. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load and environmental stresses can determine optimal economical choices of building materials used for all components in the system described herein. Availability of various building materials in different parts of the world may also affect selection of materials for building the panel described herein. Adoption of the International Building Code or similar code may also affect choice of materials.

Any reference herein to "metal" includes any construction grade metals or metal alloys as may be suitable for fabrication and/or construction of the system and components described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" includes any construction grade curable composite that includes cement, water, and a granular aggregate. Granular aggregates may include sand, gravel, polymers, ash and/or other minerals.

In some embodiments, the panel may include a plurality of joists, a corrugated form deck disposed above and attached to the plurality of joists, a ceiling substrate disposed below and attached to the plurality of joists, and an in-floor radiant heat member disposed between the corrugated form deck and the ceiling substrate. The panel may be pre-fabricated off-site and transported to a building site for installation into a structural frame of a building. In some embodiments, when the panel is installed, the corrugated form deck may provide support for a floor material for a portion of a story of a building above the panel and the ceiling substrate may provide a ceiling for a portion of a story below the panel.

In referring now to the drawings, repeating units of the same kind or generally fungible kind, are designated by the part number and a letter (e.g. 214$n$), where the letters "a", "b" and so on refer to a discrete number of the repeating items. General reference to the part number followed by the letter "n" indicates there is no predetermined or established limit to the number of items intended. The parts are listed as "a-n" referring to starting at "a" and ending at any desired number "n".

FIG. 1 illustrates an example multi-story building 102, arranged in accordance with at least some embodiments described herein. FIG. 1 shows building 102, stories 103, external frame 104, columns 106, beams 108, cross braces 110, units 112, floor-ceiling panel 114, and walls 116. The various components shown in FIG. 1 are merely illustrative, and other variations, including eliminating components, combining components, and substituting components are all contemplated.

The building 102 may include two or more stories or levels 103. The building 102 may be classified as a low-rise, mid-rise, or high-rise construction depending on the number of stories (each city or zoning authority may define building heights in any fashion they deem proper). The building 102 may include a floor-ceiling panel 114. The floor-ceiling panel as described herein may be suitable for use in a building of any number of stories (levels), including a mid-rise building and a high-rise building. In some embodiments, the building may be a residential multi-dwelling building having eight or more stories.

The building 102 may include a structural, external frame 104. The external frame 104 may serve as a structural exoskeleton of the building 102. The external frame 104 may include multiple columns 106, beams 108, and cross braces 110. The columns 106 may be oriented vertically, the beams 108 may be oriented horizontally, and the cross braces 110 may be oriented obliquely to the columns 106 and the beams 108. The beams 108 may extend between and be attached to adjacent columns 106 to connect the adjacent columns 106 to one another. The cross braces 110 may extend between and be attached to contiguous beams 108 and columns 106 to provide additional stiffness to the external frame 104. In various embodiments described herein, the external frame 104 may provide the structural support for the building 102. In some embodiments described herein, interior (demising) walls forming units or modules may not be load bearing walls. In some embodiments, the load bearing support may be provided by the external frame 104. The columns, beams and cross braces may be arranged to provide most or substantially all the structural support for building 102. The frame may be used to provide decoration or added support to the structure as well.

The building 102 may include multiple units or modules 112 disposed internally of the external frame 104. The units 112 may be commercial, residential (such as dwelling units), or both. The units 112 may be assembled at the building site using multiple pre-assembled or prefabricated components. The prefabricated components may be assembled independent of one another remotely from the building site and transported to the building site for installation. The components may be attached to the external frame 104, to adjacent components, or both at the building site to form the individual units 112. In some embodiments, the building 102 may include internal support structures. Prefabricated components may be attached to the internal support structures in some embodiments. Each story or level 103 of the building 102 may include one or multiple units 112 defined by the prefabricated components. The units may be standardized and repetitive, or unique and individualized. Mixed units of standard size and shape may be combined with unique units in the same floor, or in independent arrangement on separate floors. In some embodiments, a unit may encompass more than one floor.

The components may include one or more pre-assembled floor-ceiling panels 114 and one or more walls 116. The floor-ceiling panels 114 may be oriented horizontally and may define the floor of an upper unit and the ceiling of a lower unit. Individual floor-ceiling panels 114 may be arranged adjacent to one another in the horizontal direction and attached to one another, one or more columns 106, one or more beams 108, or any combination thereof. In some examples, the floor-ceiling panels may be attached to columns 106, beams 108, or combinations thereof only around a perimeter of the panels. The walls 116 may be oriented vertically and may define an envelope of the building and/or partition each story into multiple units, a single unit into multiple rooms, or combinations thereof. The walls 116 may be attached to the floor-ceiling panels 114 with fasteners and then caulked, sealed, or both.

Figure 2:
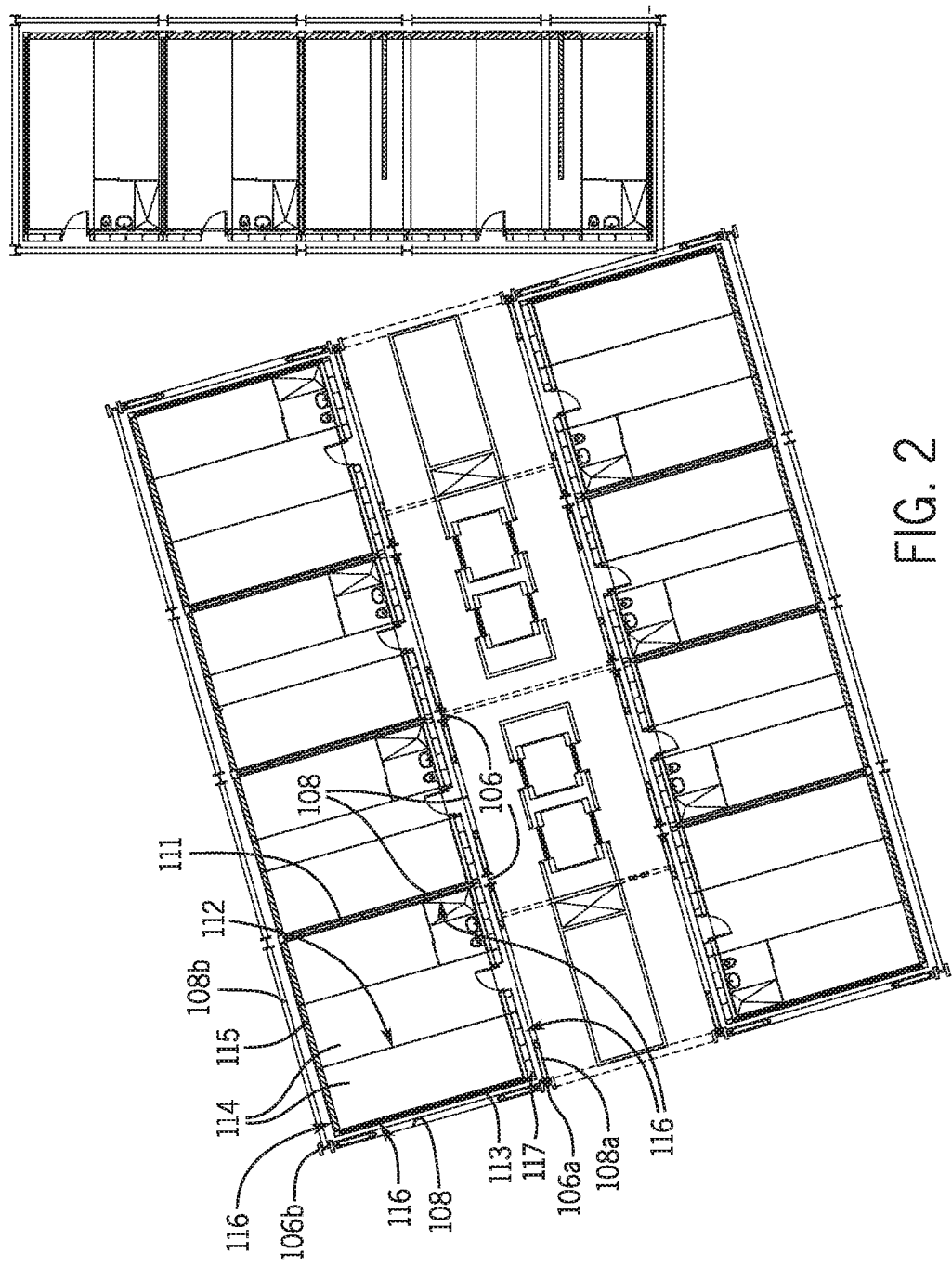
FIG. 2 is a schematic illustration of floor plans of a multi-story building.

FIG. 2 illustrates example floor plans of a multi-story building, such as building 102. FIG. 2 shows unit 112, floor-ceiling panels 114, walls 116 including a demising wall 111, an end wall 113, a window wall 115, and a utility wall 117 according to some examples herein. The various components shown in FIG. 2 are merely illustrative, and other variations, including eliminating components, combining components, and substituting components are all contemplated.

The walls 116 may include walls that partition the interior of the building, walls that include plumbing components, walls that include window components, and others. Walls that define partitions between units and or rooms within a unit may be referred to as demising walls (e.g., demising wall 111). Typically, demising walls are internal walls (e.g., walls that are not exposed to the elements). External walls, e.g., walls that define, at least partially, an envelope of the building 102, may be referred to as envelope walls. Walls that include plumbing components may be referred to as utility walls (e.g., utility wall 117) and walls that include window components may be referred to as window walls (e.g., window wall 115). End walls (e.g., end wall 113) may be positioned around a perimeter of the building. Envelope walls may include, as examples and without limitation, one or more utility walls, one or more window walls, and one or more end walls. In some examples, one or more of the walls 116 may be arranged only around the perimeter of a pre-assembled floor-ceiling panel 114. In some examples, a single pre-assembled floor-ceiling panel 114 may span the full distance between two opposing walls of the building. In some examples, a single pre-assembled floor-ceiling panel 114 may span the full distance between two envelope walls. In some examples, a single floor-ceiling panel 114 may span the distance between two opposing envelope walls along a first horizontal direction and multiple floor-ceiling panels 114 may be joined side to side to span the distance between two opposing envelope walls along a second perpendicular horizontal direction. In this manner, a plurality of panels arranged side to side along a single horizontal direction may define the full span of a story 103 of the building 102.

The prefabricated components described herein (e.g., pre-assembled floor-ceiling panels 114) may be used in a multi-story building that has at least 6 floors. In some examples, prefabricated components according to the present disclosure may be used in a multi-story building that has more than 15 floors, in some examples 20 floors or more, in some examples 30 floors or more. Typically in multi-story building construction, especially in mid- to high-rise building construction, steel framing may be used in combination with concrete for construction of wall and floor systems of the building. Concrete slabs are typically used for construction of the floor system in a multi-story building. However, slab construction may slow down the process of erecting the building as individual concrete slabs are typically constructed (poured and cured in situ) at each level or story as each new level story of the building is added. Temporary formwork for the concrete slab is installed at each level and the construction crew must wait for the concrete to cure prior to removal of the temporary formwork and completion of other elements (e.g., exterior and interior walls, window installation, various interiors elements including plumbing, mechanical, and electrical systems and finishes), which may significantly increase the construction timeline. Pre-cast (typically reinforced) concrete slabs may be used instead of casting the slabs in situ. However, there may be some limitations to using pre-cast slabs such as the weight and difficulty in transporting and installing such pre-cast slabs.

Also, stricter dimensional tolerances for the pre-cast slabs and building frame construction may need to be followed to ensure the slabs can be installed to the building frame. In addition, floor systems using concrete slab construction tend to be significantly heavier and may be costlier. For example, a floor system with a concrete slab may weight about 50 lb/ft² or more, and in some cases 100 lb/ft² or more, and may cost about $40/ft². Floor systems implemented using the examples herein may weigh on the order of 10 lb/ft² (e.g., in part due to the absence of a concrete slab), may cost about $10/ft², and may be significantly faster to construct as compared to conventional slab construction.

The present disclosure describes prefabricated components and methods for building construction and specifically for constructing a floor system of a building that may not require a concrete slab. According to some embodiments herein, a pre-assembled floor-ceiling panel includes a frame, and floor and ceiling layers attached to the frame. The floor-ceiling panels may be configured to carry diaphragm loads to the structural frame without the use of a concrete slab. Each of the floor and ceiling layers may be formed using discrete (e.g., separable) pre-manufactured construction elements (e.g., boards of non-combustible materials), which may be assembled to the frame off-site (e.g., in a factory or other location remote from the construction site). Floor-ceiling panels in accordance with the present disclosure are pre-assembled (e.g., in a factory) and delivered to the construction site for installation into a building. In some examples, use of prefabricated components as described herein may significantly reduce the field time for constructing a building, such as building 102.

Floor-ceiling panels according to the present disclosure may be configured to reduce the overall number of separate parts delivered to the job site as may be required to construct a floor system. For example, the floor-ceiling panels may include most or all of the components required to complete the construction of a floor system. In some examples, the floor-ceiling panels include all components or substantially all of the components (e.g., except finished floor surfaces) for a floor system of a building. In some examples, the floor-ceiling panels may include all of the components including the finished floor surface which may be removably attached to the floor-ceiling panel such that the finished floor surface may be temporarily removed during installation of the floor-ceiling panel. In some example, the floor-ceiling panel may be configured to reduce the overall number of components (e.g., total number of floor-ceiling panels) that may be needed to construct a floor system. Existing modular construction systems may not be designed for multi-story building construction and may typically require tens or hundreds of smaller individual components to be assembled into a single floor structure. Floor-ceiling panels may be implemented in accordance with the present disclosure to span a larger portion of the floor of any given story in a building and thereby reduce the overall number of components that may be needed to construct a floor of any given story in the building. According to some examples herein, the floor-ceiling panel may be sized such that it spans a full length of building unit, for example a full length between opposite walls of the building unit, which in some cases may correspond to the opposite exterior walls of the building. In some examples, the floor-ceiling panel may be sized such that two or more floor-ceiling panels are joined contiguously side to side to form the floor system of an entire story of the building. For example, two or more floor-ceiling panels may be joined contiguously side to side to define one of the dimensions of the story while the other dimension may be defined solely by the length of an individual floor-ceiling panel.

Figure 3:
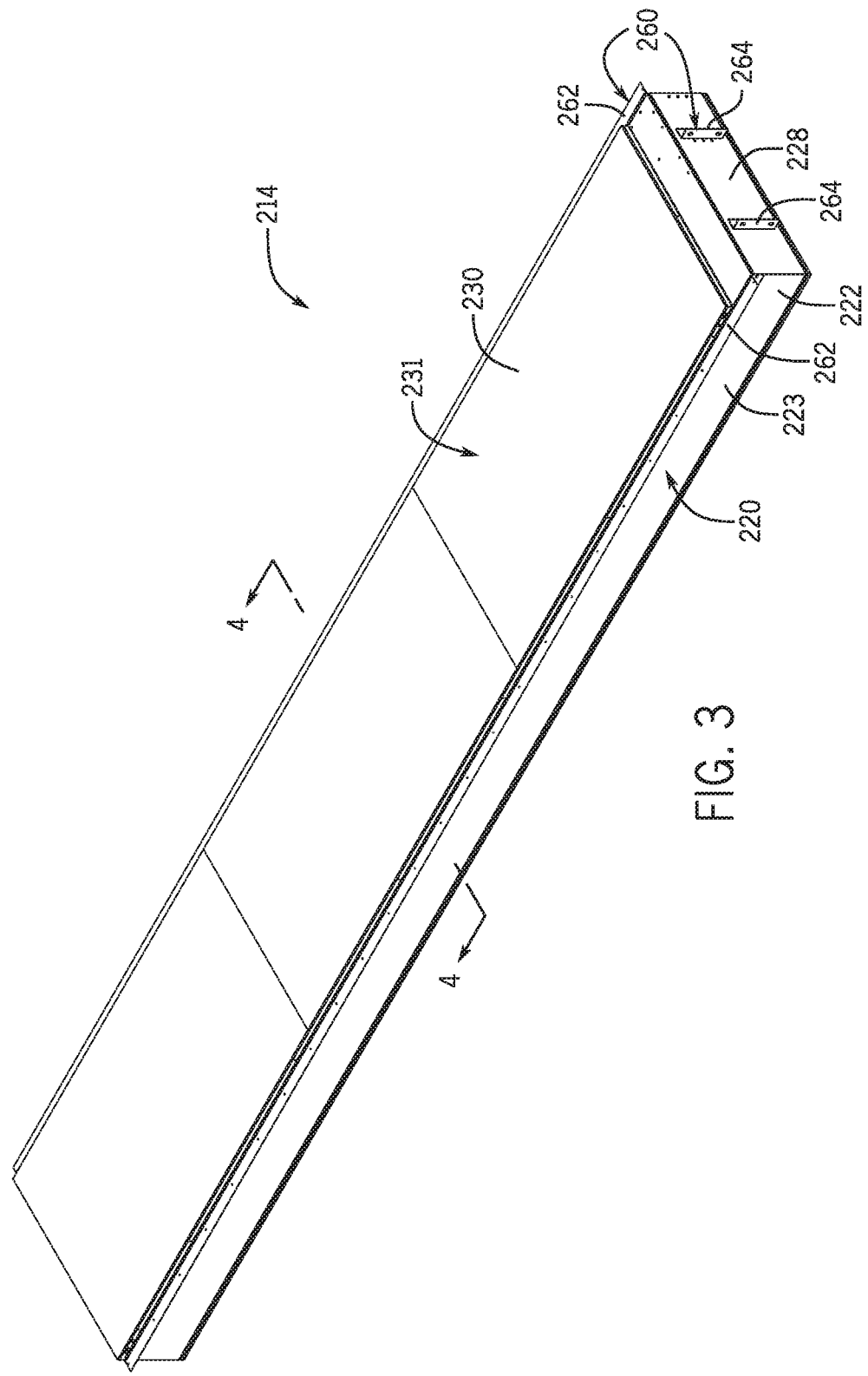
FIG. 3 is an isometric view of a floor and ceiling panel according to one embodiment.
Figure 4:
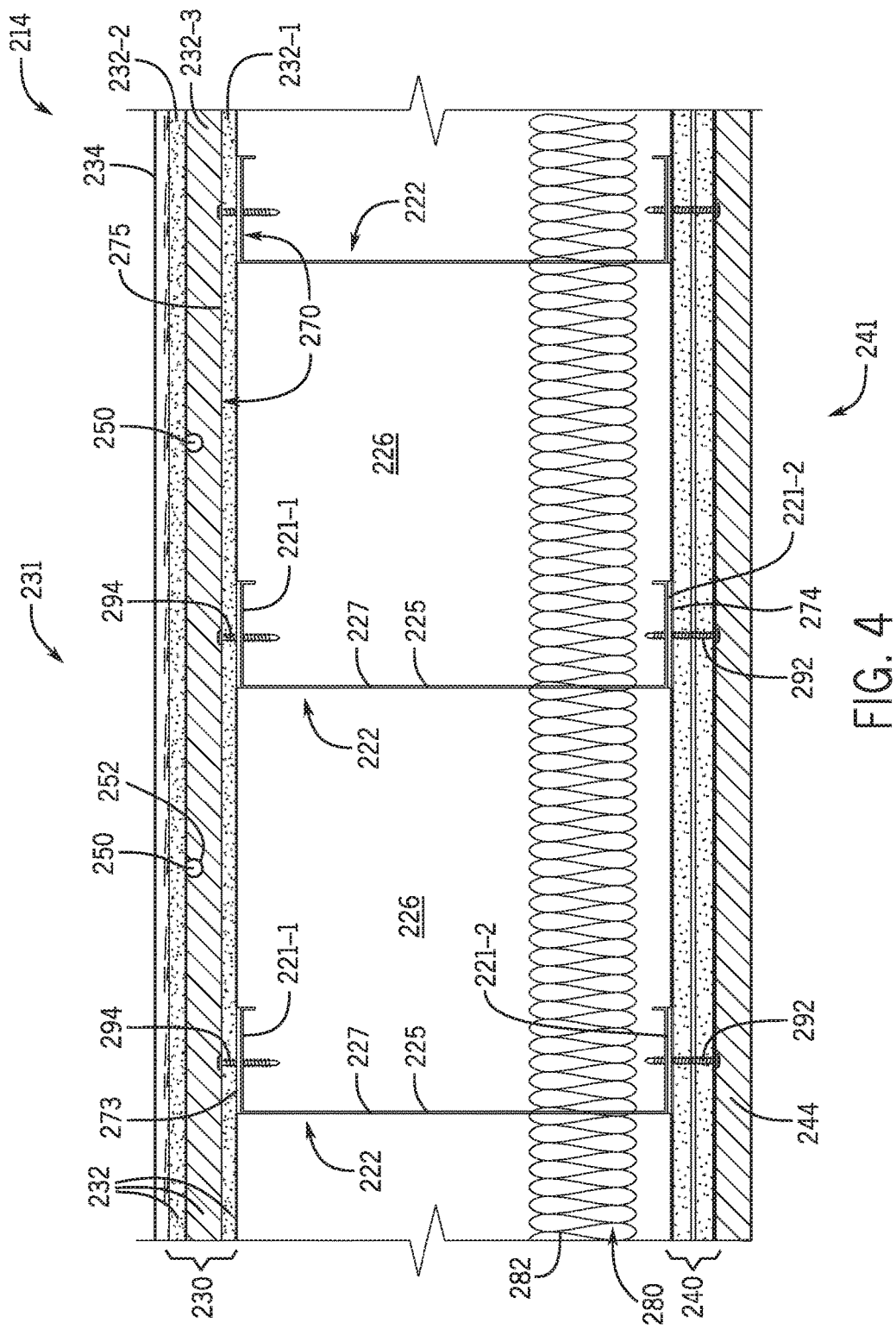
FIG. 4 is a partial cross-sectional view of the floor and ceiling panel in FIG. 2, taken at line 4-4 in FIG. 3.

FIGS. 3 and 4 illustrate a floor-ceiling panel arranged in accordance with a first embodiment of the present disclosure. FIG. 3 illustrates an isometric view of floor-ceiling panel 214 and shows panel frame 220, joists 222 including outer joist 223, end member 228, floor panel 230 provided on floor side 231, and mounting components 260 including angle members 262 (e.g., angle irons), and brackets 264. FIG. 4 illustrates a partial cross-sectional view of floor-ceiling panel 214 and joists 222 including inner joists 225, joist cavities 226. FIG. 4 also shows ceiling panel 240 including ceiling layers 242 on ceiling side 241, floor panel 230 including floor layers 232 on floor side 231, radiant heating element 250 received in channel 252, ceiling finish 234, floor finish 244, sound insulative material 270 (e.g., sound strips 273 and 274, sound insulation pad 275), and thermal insulative material 280 (e.g., mineral wool insulation 282). The various components shown in FIGS. 3 and 4 are merely illustrative, and other variations, including eliminating components, combining components, and substituting components are all contemplated.

The floor-ceiling panel 214 may be used to implement one or more of the floor-ceiling panels 114 of building 102. When installed in a building, the floor-ceiling panel 214 may provide a floor and a ceiling for two vertically adjacent units in a building. For example, a first side 231 of the floor-ceiling panel 214 may define the floor of an upper unit and may thus be referred to as floor side. An opposite or second side 231 of the floor-ceiling panel 214 may define the ceiling of a lower unit of the building, and may thus be referred to a ceiling side.

The floor-ceiling panel 214 may include a panel frame 220, a floor panel 230, and a ceiling panel 240. The panel frame 220 may include plurality of joists 222 attached to opposing end members 228 (only one of the two end members is shown in FIG. 2). The joists 222 may include outer joists 223 (only one of two opposing outer joists is shown in FIG. 2) and inner joists 225. The joists 222 may form supporting members that span the distance between the opposing end members 228. The joists 222 may support floor panel 230 and ceiling panel 240 which may provide the floor of an upper unit and the ceiling of a lower unit. In some examples, the joists 222 may be sufficiently long to span substantially the full length of a unit, such as unit 112 of building 102. In some examples, the length of the joists 222 may be such that a single floor-ceiling panel 214 provides a floor and a ceiling for multiple horizontally adjacent units. In some examples, the joists may be about 24 feet long. The joists 222 may be shorter or longer than 24 feet in other examples, for example and without limitation 18 feet, 20 feet, 26 feet, 28 feet, etc. Generally, the length of the joists 222 may be selected as may be appropriate for a particular building project.

The panel frame 220 may be formed of metal, such as aluminum or steel. In some embodiments, the panel frame 220 may be formed of a non-metallic material, such as wood, plastic, or composite materials such as fiber reinforced composites. In some embodiments, the joists 222 may be formed of metal, such as aluminum or steel, for fire resistance, structural strength, weight reduction, or other factors. In some embodiments, the joists 222 may be formed of a non-metallic material, such as wood or plastic. In the illustrated example, the joists 222 and end members 228 are formed of metal and have a C-shaped cross-section defined by flanges 221-1, 221-2 and web 227 connecting the flanges.

In other examples, the joists 222 may have a different cross-section. For examples, the joists 222 may be implemented using I-beams. One or more apertures may be formed in the web 227, for example by punching or other known manufacturing techniques, e.g., for reducing the overall weight of the floor-ceiling panel 214 and or accommodating elements (e.g., conduits, wiring, insulation) extending into multiple adjacent joist cavities. In some embodiments, the joists 222 may be formed of lightweight steel and may be manufactured by Steelform Building Products Inc. (marketed under the name Mega Joist).

The joists 222, including outer 223 and inner joists 225 may be arranged generally parallel (e.g., plus or minus fifteen degrees) to one another. The joists 222 may be oriented generally perpendicular (e.g., plus or minus fifteen degrees) to the end members 228. The outer joists 222 (only one of the two outer joists is visible in the view in FIG. 2) may be attached (e.g., welded, bolted, or adhered) to the end members 228 to define a perimeter of the panel frame 220. The panel frame 220 may have a generally rectangular shape. In some examples, any of the joists 222, such as the outer joists 223, may be integral with one or more of the end members 228 (e.g., machined, cast, etc. as unitary component). Mounting components 260, such as for attaching the floor-ceiling panel 214 to adjacent floor-ceiling panels or the building's structural frame, may be provided around the perimeter of the panel frame 220. For example, one of more mounting components 260 (e.g., angle member 262, bracket 264) may be attached to one or more of the outer joists 222 and/or one or more of the end members 223.

The inner joists 225 may be spaced apart from the outer joists 223 and from one another to define joist cavities 226. The joists 222 may be spaced apart at regular intervals along the length of the end members 228. In some embodiments, the joists 222 may be spaced at between about eight inch on center to about thirty six inches on center along the length of the end members 228. In some embodiments, the joists 222 may be spaced at two foot on center along the length of the end members 228. The number of joists 228, the spacing of the joists 228, the length of the joists 228 (e.g., which also defines the spacing between the end members 228), and/or the length of the end member 228 may be selected, e.g., based on the load requirements for the floor-ceiling panel 214 and/or other parameters or requirements for the particular building. The specific combination illustrated in the examples in FIGS. 2 and 3 are provided for illustration and panel frames 220, and correspondingly floor-ceiling panels 214 having different sizes than those specifically illustrated and described may be implemented in accordance with the present disclosure.

Other parameters of the joists may be varied to suit the particular needs of a building project. For example, in the case of metal joists, the height of the web, width of the flanges, and thickness (gage) of the metal may be varied as needed. For example, a 14 gage metal joist having a height of about 10 inches and flange width of about 2 inches may be used for the joists 222 and end members 228. In some examples, the certain dimensions and/or material of the joists may differ from corresponding dimensions or material of the end members.

A ceiling panel 240 may be attached to the frame 220 to define the lower or ceiling side of the floor-ceiling panel 214. The ceiling panel 240 may support a ceiling material (e.g., a ceiling finish 244) of the lower unit. The ceiling finish 244 may be attached (e.g., removably attached) to the floor-ceiling panel 214 at the factory and form a part of the pre-assembled floor-ceiling panel 214. In some examples, the ceiling finish 244 is attached to the floor-ceiling panel 214 after the floor-ceiling panel 214 is installed. In some examples, the ceiling finish may include acoustical ceiling panels which may be attached to the ceiling panel 240. Acoustical ceiling panels may be made from one-hundred percent polyester and may be manufactured by Acoustical Solutions (marketed under the name PolyPhon™ Polyester Acoustical Panels).

The ceiling panel 240 may be formed using one or more distinct (e.g., separable, prefabricated) layers or substrates 242. One or more of the layers 242 may be implemented using non-combustible materials, such as cement board, magnesium oxide (MgO) board, fiber-cement board, gypsum board, fiberglass-clad cement or gypsum board, metal-clad cement or MgO board, and the like. The thickness of the ceiling panel 240 may be adjusted as may be appropriate for a particular building project, e.g., to meet fire safety requirements. In some examples, individual ones of the layers 242 may be about ½ inch thick to about 1 inch thick. In some examples, each layer 242 may be about ⅝ inches thick.

In the illustrated embodiment, the ceiling panel 240 includes two layers 242 of non-combustible material. In other embodiments, fewer or greater number of layers 242, or layers of different thicknesses, may be used for the ceiling panel 240. In some examples, the layers 242 may be of the same or dissimilar material. During assembly of the floor-ceiling panel 214, one or more layers 242 may be placed against the frame 220 (e.g., against the flanges 221-2) and may be joined directly to the frame using conventional fastening techniques (e.g., threaded fasteners 292). In some examples, a flat-head fastener or another type of fastener may be installed substantially flushed with the outer surface of the ceiling panel 240 such that ceiling finish 244 can be installed directly against the ceiling panel 240. In some examples, the ceiling finish 244 may be adhered to the ceiling panel 240. In some examples, additional layers or panels (e.g., sound or thermally insulative layers) may be installed between the ceiling panel 240 and the ceiling finish 244 and/or between the ceiling panel 240 and the frame 220. For example, a sound insulative material, such as sound strips 274, may be provided between the panel frame 220 and the ceiling panel 240. The strips 274 may be made from sound insulative material (also referred to as sound strips) may be provided between the panel frame 220 and ceiling panel 240. The strips 274 may have dimensions which substantially correspond with dimensions of the flanges 221-2 and may be arranged in a pattern corresponding to the pattern formed by the flanges 221-2 as assembled in panel frame 220.

A floor panel 230 may be attached to an upper or floor side of the floor-ceiling panel 214. The floor panel 230 may support a floor material (e.g., a floor finish 234 such as wood, tile, or laminate flooring) of the upper unit. The floor finish 234 may be attached (e.g., removably attached) to the floor-ceiling panel 214 at the factory and form a part of the pre-assembled floor-ceiling panel 214. In some examples, the floor finish 234 may be delivered separately to the construction site and attached to the floor-ceiling panel 214 after the floor-ceiling panel 214 has been installed.

The floor panel 230 may be formed of one or more distinct (e.g., separable, prefabricated) layers or substrates 232. The layers 232 may be stacked and attached to one another using conventional fastening techniques (e.g., using fasteners or adhesives). One or more of the layers 232 may be formed of non-combustible materials, such as cement board, magnesium oxide board, fiber-cement board, gypsum board, fiberglass-clad cement board, or the like. Parameters of the floor panel 230, such as thickness of the floor panel 230 or individual layers 232 and number of layers, may be adjusted as may be appropriate for a particular building project, e.g., to meet fire safety requirements, diaphragm requirements, etc. In some examples, individual ones of the layers 232 may be about ½ inch thick to about 1 inch thick. In some examples, individual layers 232 may be thinner than ½ inch. In some examples, individual layers 232 may be thicker than 1 inch. At least one of the layers 232 may be configured to accommodate a radiant heating element 250. The radiant heating element 250 may be provided within the depth of the floor panel 230 and may thus be referred to as in-floor radiant heating element.

As illustrated in FIGS. 2 and 3, the floor panel 230 may include three stacked layers or substrates 232-1, 232-2, and 232-3. The floor panel 230 may include a shaped substrate 232-3 disposed between first (inner) and second (outer) layers 232-1 and 232-2. The inner and outer layers 232-1 and 232-2 are spaced from one another, e.g., by a distance substantially equal to the thickness of the shaped substrate 232-3, in order to accommodate the shaped substrate 232-3 therebetween. It will be understood that the terms inner and outer with regards to the layers 232 are used to illustrate the relative position of these layers (e.g., inner indicating a position relatively closer to the frame and outer indicating a position relatively further from the frame) and are not meant to limit the structure in any way.

The first and second layers 232 may be generally planar layers formed of non-combustible material such as cement board, magnesium oxide board, fiber-cement board, gypsum board, fiberglass-clad cement board, or the like. Each of the first and second layers 232-1 and 232-2 may be formed using one or more cement boards, magnesium oxide boards, fiber-cement boards, gypsum boards, fiberglass-clad cement boards, or the like. The first layer 232-1 may be attached directly to the frame 220 for example using conventional fastening techniques (e.g., threaded fasteners 294). In some examples, a sound insulative material may be provided between the panel frame 220 and the floor panel 230. For example, strips 273 of sound insulative material may be provided between the panel frame 220 and the substrate 232-1. The strips 273 may have dimensions which substantially correspond with dimensions of the flanges 221-1 and may be arranged in a pattern corresponding to the pattern formed by the flanges 221-1 as assembled in panel frame 220. The second layer 232-2 may be formed of non-combustible material (e.g., cement board, MgO board) may be provided above and spaced from the substrate 232-1 such as to accommodate the shaped substrate 232-3 therebetween.

Shaped substrate 232-3 may be provided between the first and second layers 232-1 and 232-2. Shaped substrate 232-3 may include a channel 252 for accommodating radiant heating element 250. For example, the channel 252 may be defined by upper surface of the shaped substrate 232-3. The radiant heating element 250 may be a hydronic heating element implemented using flexible plastic tubing (e.g., PEX tubing). In other examples, the radiant heating element 250 may be an electrical heating element received in the channels 252. The shaped substrate 232-3 may be implemented using one or more pre-formed boards made from a thermally insulative material (e.g., high density polystyrene foam) with a sheet of thermally conductive material (e.g., aluminum sheet) attached, e.g., bonded, to the surface defining the channel 252. The channel 252 may be shaped to receive the radiant heating element 250, at least partially therein. In some example, the channel 252 may be shaped to retain the radiant heating element 250 therein by friction. In some examples, the heating element 250 may additionally or alternatively be secured to the shaped substrate 232-3 using conventional fastening techniques (e.g., adhesive, fastening clips, or the like). In some examples, the radiant heating element 250 may be retained in the channel 252 by virtue of the shaped substrate 232-3 being provided below the outer layer 232-2. Additional layers or substrates may be provided adjacent or between any of the layers 232-1, 232-2, and 232-3.

After the frame 220 has been formed and lined with sound insulative material, an example sequence of assembling the floor panel 230 to the frame 220 may include attaching the first layer 232-1, e.g., using fasteners 294, to the frame. An insulation pad 276 may be provided over the first layer 232-1, before or after the first layer 232-1 has been attached to the frame 220. The radiant heating element 250 may be inserted in the channel 252 and the second layer 232-2 and the shaped substrate 232-3 may be joined to one another before attaching them to the first layer 232-1. The second layer 232-2 and shaped substrate 232-3 may be joined for example using an adhesive. The joined layers 232-2 and 232-3 may be attached to the first layer 232-1 for example using an adhesive.

Example 1

According to a first non-limiting example, a floor-ceiling panel may include a frame, a floor panel, and a ceiling panel. The panel frame may be generally rectangular and may be formed of a plurality of joists (e.g., five joists, six joists, seven joists, eight joists, nine joists, or fewer or greater number of joists) connected to opposing end members. The joists may be spaced at about 12 inch on center and have a length of about 24 feet forming a panel frame with an overall length of above 24 feet, and depending on the number of joists, an overall width of from about 4 feet to about 8 feet. The height of the joists and end members may be about 12 inches, with the panel frame thus having a depth of about 12 inches. The panel frame may be made of metal, such as construction grade steel. For example, the panel frame may be made of 14 gage steel C-joists attached to a pair of opposing end member in the form steel C-channels. The joists may be fastened to the end member using 16 gage angle clips. The ceiling panel may include at least one layer, and in some examples two layers, of exterior sheathing material. In some examples, the sheathing material may include a gypsum core reinforced with glass fibers and fiberglass mat on one or both sides of the core. In some examples, the ceiling panel may be implemented using DENSGLAS sheathing as supplied by Georgia Pacific. In some examples, the ceiling panel may be formed of multiple boards of sheathing material, which may be pre-manufactured in smaller sizes than the overall size of the floor-ceiling panel. The sheathing boards may be laid side to side and fastened (e.g., mechanically fastened) to the frame to form the ceiling panel. For example, for an 8 ft×24 ft floor-ceiling panel, 6 4 ft×8 ft boards of DENSGLAS sheathing may be used. For a ceiling panel that includes multiple layers, a staggered arrangement may be used to offset the seams between adjacent boards on each layer.

The floor panel may include at least one layer made from one or more non-combustible boards (e.g., MgO board or HARDIEBACKER board as supplied by James Hardie) and a metal sheet or metal diaphragm (e.g., 22 gage sheet of steel) disposed between the frame and the non-combustible boards. This layer may be referred to as diaphragm layer.

The metal diaphragm may be bonded to the non-combustible board or it may be laid against the non-combustible board between the frame and the non-combustible board but not otherwise attached to the non-combustible board. In some examples, the floor panel may be fastened directly to the metal frame (e.g., using threaded fasteners). In some examples, the floor panel may be implemented using SURE-BOARD sheathing as supplied by CEMCO. In some examples the floor panel is made from multiple non-combustible boards arranged side to side with lap joints between adjacent boards. For example, for an 8 ft×24 ft floor-ceiling panel, 12 4 ft×4 ft boards of SURE-BOARD sheathing may be laid side to side to form the floor panel. In some examples, the floor panel may optionally include additional layers, for example a radiant heating layer provided over the diaphragm layer. The floor-ceiling panel may include one or more mounting components, such as angle members (e.g., 18 gage steel angle) or brackets (e.g., steel angle brackets) for attaching the floor-ceiling panel to adjacent floor-ceiling panels and/or the structural frame. The mounting components may be configured to distribute diaphragm loads across adjacent floor-ceiling panels and to the structural frame.

Figure 5:
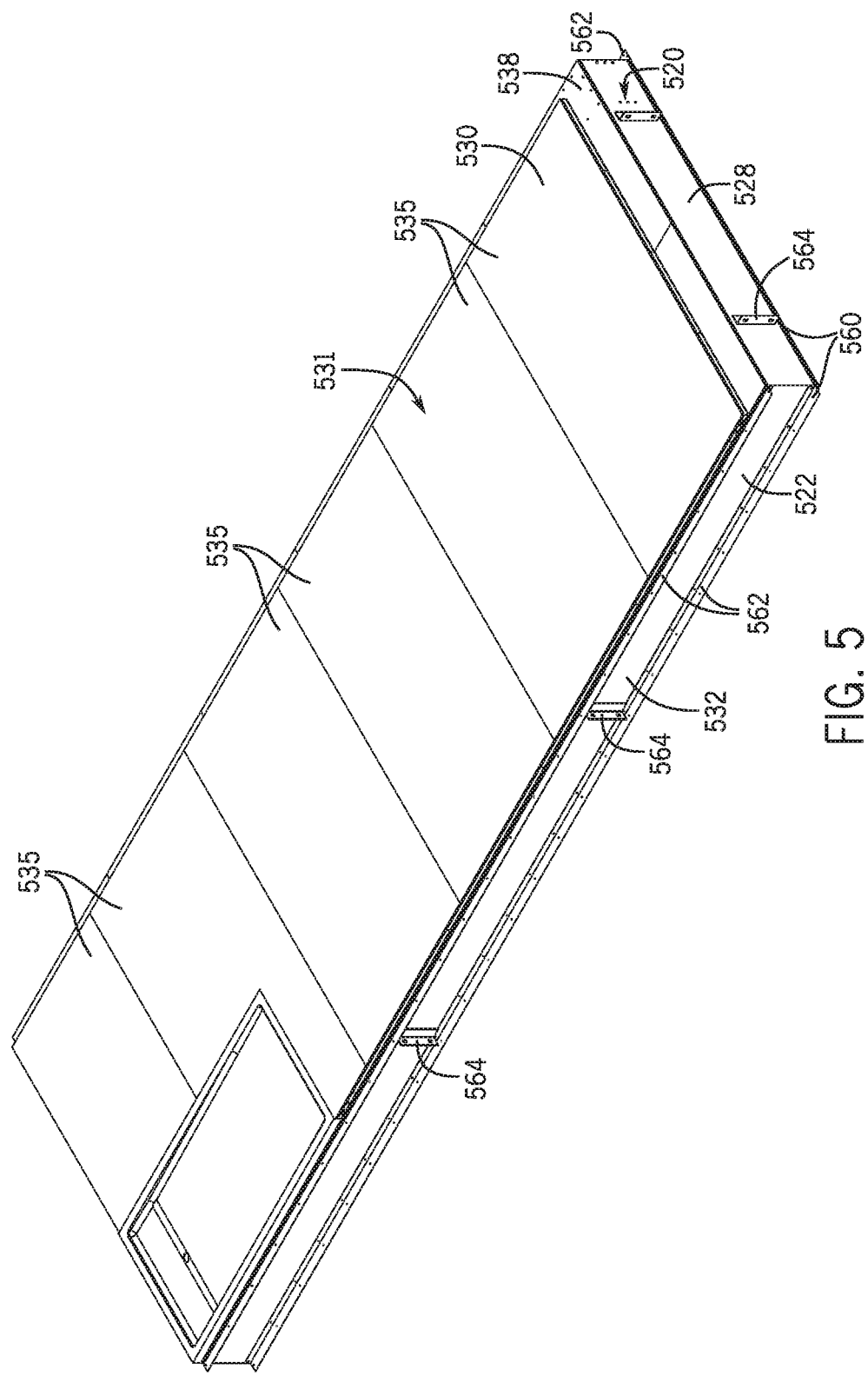
FIG. 5 is an isometric view of a floor and ceiling panel according to another embodiment.
Figure 6:
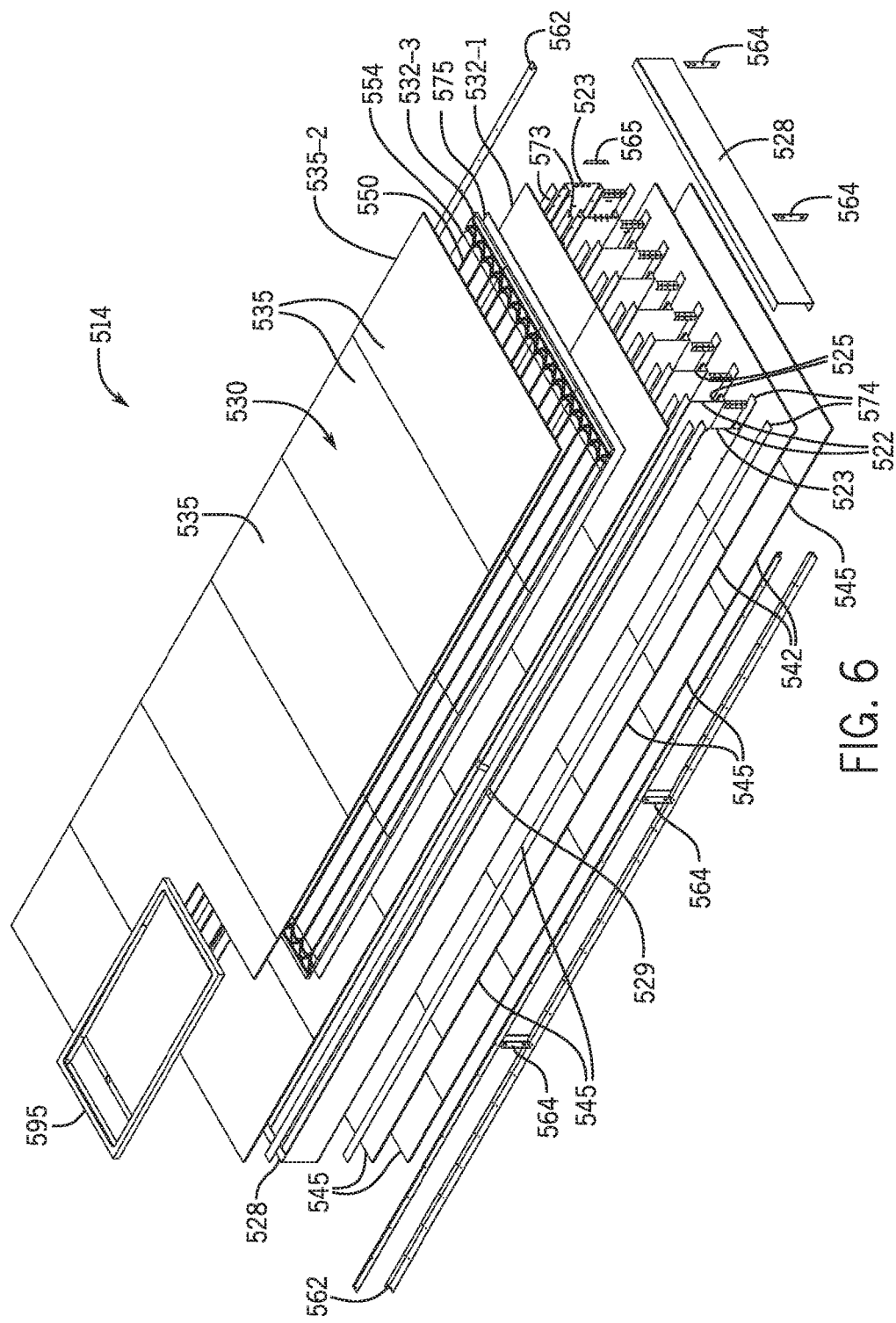
FIG. 6 is a partially exploded view of the floor and ceiling panel in FIG. 5.
Figure 7:
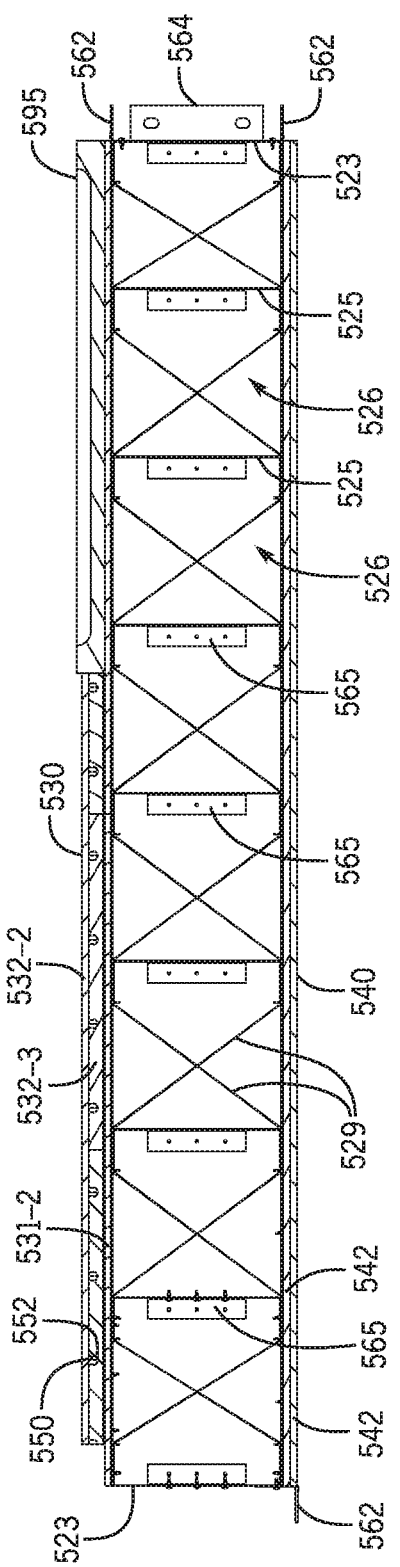
FIG. 7 is a cross-sectional view of the floor and ceiling panel in FIG. 5 taken at line 7-7 in FIG. 5.

FIGS. 5-7 illustrate views of a floor-ceiling panel 514, arranged in accordance with another embodiment of the present disclosure. FIG. 5 illustrates an isometric view of floor-ceiling panel 514 and shows panel frame 520, joists 522 including outer joist 523, end member 528, floor panel 530 provided on floor side 531, and mounting components 560 including angle members 562, and brackets 564. FIG. 6 illustrates an partially exploded view of the floor-ceiling panel 514 and shows joists 520 including outer joists 523 and inner joists 525, end members 528, floor panel 530 including pre-fabricated boards 535, ceiling panel 540 including pre-fabricated boards 545, sound strips, and waterproof liner 595. FIG. 7 illustrates a transverse cross-sectional view of panel 514 taken along line 7-7. FIG. 7 shows joists 522 (e.g., inner joists and outer joists), joist cavities, straps, floor panel 530 including floor layers 532, ceiling panel 540 including ceiling layers 542, waterproof liner 595, angle clips, and angle members 562. The various components shown in FIGS. 5-7 are merely illustrative, and other variations, including eliminating components, combining components, and substituting components are all contemplated.

The floor-ceiling panel 514 may include one or more components that are similar to those of the floor-ceiling panel 214 and the description of some of these components may not be repeated for brevity. The floor-ceiling panel 514 may be used to implement one or more of the floor-ceiling panels 114 of building 102. The floor-ceiling panel 514 may include a panel frame 520, a floor panel 530, and a ceiling panel 540. The panel frame 520 may include plurality of spaced apart joists 522 disposed between and connected to opposing end members 528. The joists 522 may span the length of the floor-ceiling panel 514 and may thus be referred to as longitudinal span members. The joists 520 may be sufficiently long to span the full length of a unit, such as unit 112 of the building 102 in FIG. 1. The end members 528 may be arranged transversely to the joists 522 at opposite ends of the joists 522 and may thus be referred to as transverse members. In some examples, end members 528 may span the width of a unit such that a single floor-ceiling panel may define the floor of the unit. In some examples, a plurality of floor-ceiling panels 514 may be joined side to side for form the floor structure of the unit.

The joists 522, including outer 523 and inner joists 525 may be arranged generally parallel (e.g., plus or minus fifteen degrees) to one another, and generally perpendicular (e.g., plus or minus fifteen degrees) to the end members 528 to define a generally rectangular panel frame 520. In other examples, panel frames of different shapes (e.g., trapezoidal, rhomboid) maybe be defined using different arrangements of joists and end members as may be appropriate for a particular building project.

In some embodiments, the joists 522 may be formed of metal, such as aluminum or steel, for fire resistance, structural strength, weight reduction, or other factors. In some embodiments, the joists 522 may be formed of a non-metallic material, such as wood or plastic. In the illustrated example, the joists 522 and end members 528 are implemented using metal members having a generally C-shaped cross-section (e.g., C-channels or C-joists). Joists having different shapes may be used, e.g., I-beams, box beams, or others. The joists 522 may be attached to the end members 528 using conventional techniques (e.g., welded or fastened thereto). In some examples, angle clips 565 (e.g., steel clips) may be used to attach the joists to the end members, or example by fastening end portions of the webs of the joists to respective webs of the end members. The outer joists 523 and end members 258 may form a perimeter portion of the panel frame 520.

The joists 522 may be spaced to define joist cavities 516. In some examples, thermally insulative material (e.g., mineral wool, sprayed insulation) may be provided within the joist cavities 516. In some examples, fire retardant material may be provided in the joist cavities 516. In some examples, plumbing and/or electrical conduits may be routed through the joist cavities 516. In some examples, straps 529 may be attached to the joists obliquely within joist cavities 516, e.g., to increase the lateral stability of the panel frame 520. The number of joists 320, spacing of the joists 320 and other parameters associated with the joists (e.g., dimensions, material, and cross-section) may be varied to suit the requirements for the particular building project.

A ceiling panel 540 may be disposed below and attached to the panel frame 520. The ceiling panel 540 may be provided on the lower or ceiling side 541 of the panel frame 520 and may provide a ceiling for a unit. The ceiling panel 540 may include at least one distinct layer 542 of non-combustible material. For example, the ceiling panel 540 may be formed using one or more pre-fabricated boards 545 of non-combustible material (e.g., cement boards, MgO boards, fiberglass-clad cement or gypsum boards, etc.). The pre-fabricated boards 545 of non-combustible material may be manufactured in standard sizes, which may be smaller sized or different sizes or shapes than the overall size or shape of a given floor-ceiling panel. In such cases, a plurality of boards may be arranged contiguously (side-to-side) to form a layer 542 of the ceiling panel 540. The ceiling panel 540 may include multiple layers 542, in some examples two layers, and in some example more than two layers. In some examples, pre-fabricated boards 545 may be made to size and/or shape corresponding to the floor-ceiling panel 514 and in such cases, a single board may be used for each layer of the ceiling panel 540. The thickness of the ceiling panel 540 and/or of the individual layers 542 may be tailored as appropriate for a particular building project, e.g., to meet fire safety requirements.

A floor panel 530 may be disposed above and attached to the panel frame 520. The floor panel 530 may be provided on the upper or floor side 531 of the panel frame 520 and may provide a floor of a unit. The floor panel 530 may be formed of a plurality of stacked layers 532 of non-combustible material. At least one layer of the plurality of stacked layers may be configured to accommodate a radiant heating element 550. In some examples, the floor panel 530 may include at least two layers of non-combustible material and a radiant heating layer sandwiched therebetween.

For example, a first layer 532-1 of the floor panel 5310 may be formed using one or more pre-fabricated boards 535 of non-combustible material (e.g., cement board, magnesium oxide board, fiber-cement board, gypsum board, or the like, which may interchangeably be referred to as non-combustible boards and which may in some examples be fiber reinforced and/or clad with a sheet layer such as a fiberglass layer). Typically, the individual boards that form stacked layers of the floor or ceiling panels (e.g., boards 535, 545) may be staggered to avoid alignment of seams in adjacent layers. The first layer 532-1 may be disposed over and attached directly to the panel frame 520. A second layer 532-2 formed of one or more pre-fabricated boards 535 of non-combustible material may be disposed over and spaced from the first layer 532-1 by a sufficient distance to accommodate a radiant heating layer 532-3. The radiant heating layer 532-3 may be implemented using a shaped substrate sandwiched between the first and second layers. The shaped substrate may include a channel 552, which encloses substantially or in part the radiant heating element 550. The channel 552 may be formed within the radiant heating layer 532-3 or defined by a surface (e.g., an upper surface) of the shaped substrate. By forming the channel 522 closer to the upper or floor side of the floor-ceiling panel, heat transfer to the floor side 531 of the floor-ceiling panel 514 may be improved.

The floor panel 530 or at least one layer thereof may extend substantially the entire length and width of the panel frame 520 to enclose the upper side of the frame 520. The ceiling panel 540 or at least one layer thereof may extend substantially the entire length and width of the panel frame 520 to enclose the lower side of the frame 520. In some example, one or more of the layers of the ceiling panel or the floor panel may be shorter in length and/or width than other panels. For example, the first layer 532-1 of the floor panel 530 may extend substantially the entire length and width of the panel frame 520 while other layers (e.g., second layer 532-2 and shape substrate 532-3) may be shorter in length than the first layer 532-1, shorter in width than the first layer 532-1, or both. In this manner, the floor-ceiling panel 514 may be configured to accommodate a wall (e.g., wall 116) around a perimeter of the floor-ceiling panel 514. In some examples, the dimensions of one or more of the layers of floor-ceiling panel 514 (e.g., second layer 532-2 and shape substrate 532-3) may be selected to define a ledge 538 for supporting a wall (e.g., a demising wall, a window wall or another type of wall). In some examples, the wall may be implemented using a pre-assembled wall panel.

A layer of thermally-conductive material 554 may be disposed over the surface defining the channel 552. The layer of thermally-conductive 554 material may be implemented as a sheet of material (e.g., sheet of aluminum, steel, aluminum alloy or another type of alloy) bonded to the shaped surface of the radiant heating layer 532-3. The layer of thermally-conductive material 554 may improve radiant heat transfer from the radiant heating element 550 towards the floor side 531 of the floor-ceiling panel 514. The radiant heating element 550 may include one or more straight sections 551-1, which may extend parallel to the joists 522, and one or more transverse sections 551-2 connecting the straight sections. The transverse sections may be curved and may be provided proximate the perimeter of the floor panel 530. In some embodiments, the radiant heating element 550 may be formed of hydronic radiant heat piping or tubing. In some embodiments, the radiant heating element 550 may be formed as a pipe or tube of cross-linked polyethylene, commonly referred to as PEX piping or tubing. The radiant heating element 550 may be pressed into the channel and retained therein substantially by friction. In some examples, the radiant heating element 550 may be, additionally or alternatively, secured to the channel 552 using an adhesive. In some examples the radiant heating element 550 may be secured in the channel by virtue of the layer 532-2 provided over the radiant heating layer 532-3 and enclosing the channel 552.

Thermal insulation may be provided between the floor panel 530 and the ceiling panel 540. In some examples, the thermal insulation may include mineral wool. In some examples, the thermal insulation may be sprayed on insulation, such as closed-cell spray foam provided by ICYNENE. In some examples, the thermal insulation may be any type closed or open cell foam having composition such polyurethane, polyisocyanurate, or other isocyanate polymers.

Sound insulative material (e.g., sound strips 573, 574, sound insulation pad 575) may be provided between the panel frame 520 and the floor and ceiling panels 530, 540, respectively. The sound insulative material may be configured to effectively mitigate floor impact and ambient noise sound transmission to meet building codes. For example, first plurality of sound strips 573 may be attached to the flanges on the floor side 531 and a second plurality of sound strips 574 may be attached to the flanges on the ceiling side 541 of the panel frame 520. The strips 573, 574 may have a length corresponding to a length of an associated joist 522 or end member 528. The strips 573, 574 may have a width corresponding to a width of an associated joist 522 or end member 528. In some embodiments, the strips 573, 574 may be designed to match the footprint of the frame 520 and rest, respectively on top or on the bottom of the frame 520. In some embodiments, the strips 573, 574 may be designed to be smaller than the footprint of the frame 520 such that a portion of the frame is not covered by the strips 573, 574. The thickness of the strips 573, 574 may be varied as needed for a particular building project. In some embodiments, the strips 573, 574 may have a thickness between about one-eighth of an inch and about one inch. In some embodiments, the strips 573, 574 may have a thickness of about one-quarter of an inch. The sound insulative material (e.g., sound strips 573, 574) may be formed of various materials, for example an elastomeric material, such as rubber. In some embodiments, the sound insulative material may be formed of recycled, ground-up rubber tires, rubber, foam padding, or other material with acoustic dampening properties. In some examples, sound insulative materials, for example implemented as a sound insulation pad 575 may be provided between layers of the floor panel, the ceiling panel, or both. The sound insulation pad 575 may be made of similar materials as the sound strips 573, 574 or other suitable materials for mitigating sound transmission through the floor-ceiling panel.

In some examples, as in the illustrated embodiment, the floor-ceiling panel 514 may provide a floor to a portion of the unit which includes a shower facility. In this regard, floor-ceiling panel 514 may include a waterproof liner 595 integrated into the floor panel 340. For example, the waterproof liner 595 may be implemented in the form of a shower pan made from any suitable material such as plastic, ceramic, metal, or others. The waterproof liner 595 may be provided over the first layer and attached (e.g., adhered) directly thereto.

The floor-ceiling panel 514 may include one or more mounting components 560 for attaching the floor-ceiling panel 514 to a building's structural frame and/or for joining adjacent floor ceiling panels. For example, the floor-ceiling panel 514 may include one or more angle members 562 and one or more angle brackets 564, which may be attached to the perimeter portion of the panel frame 520. The angle members may be used to join adjacent floor-ceiling panels 514 and/or join the floor-ceiling panel 514 to a structural member (e.g., beam 108 of building 102). The angle brackets 564 may be used for joining the floor-ceiling panel 514 to the structural frame. The floor-ceiling panel 514 may include any number of mounting components (e.g., angle members 562 and brackets 564) as may be suitable for a particular application. In some examples, the floor-ceiling panel 514 may include at least one angle member 562 that extends partially or substantially fully along the length of the panel frame (e.g., along an outer joist 523). One or more angle members 562 may be attached longitudinally along the outer joists. In some examples, a plurality of spaced and generally parallel angle members may be attached along a same side of the frame (e.g., to a same joist). One or more angle brackets 564 may be attached vertically (e.g., generally perpendicular, plus or minus 15 degrees) to the angle members 562. When joined to a building's structural frame, the angel brackets may be generally vertical with respect to a horizontal structural member (e.g., beam 108 of building 102). One or more angle brackets 564 may be attached along the perimeter portion of the frame, for example to the outer joists 523 and end members 528. In other examples, differently shaped or configured mounting components may be used, such as T-shaped, I-shaped, or box-shaped brackets.

Example 2

According to another non-limiting example, a floor-ceiling panel may include a frame, a floor panel, and a ceiling panel. The panel frame may be generally rectangular and may be formed of nine joists spaced at about 12 inch on center and having a length of about 24 feet, defining a panel frame having an overall length of about 24 feet and overall width of about 8 feet. The height of the joists and end members may be about 12 inches, with the panel frame thus having a depth of about 12 inches. The panel frame may be made of metal, such as aluminum or construction grade steel. The panel frame may be made of a plurality of 14 gage steel C-joists attached to a pair of opposing end member in the form steel C-channel. The joists may be fastened to the end member using 16 gage angle clips. The panel may include at least one angle member (e.g., 18 gage steel angle) attached to the perimeter of the panel frame and extending along the length of the panel frame. The ceiling panel may include two layers of fiberglass-clad gypsum board each having a thickness of about ⅝ inches. The ceiling panel layers may be fastened to the joists using threaded fasteners.

The floor panel may include a plurality of layers including a bottom layer and a top layer, one or both of which may be made from non-combustible material, and a radiant heating layer between the bottom and top layers. The bottom layer may be implemented with a board having non-combustible core such as cement board, fiber cement board, gypsum board, or the like, and a steel diaphragm (e.g., 22 gage galvanized sheet steel) bonded thereto. The bottom layer may be arranged such that the metal-clad side of the bottom layer faces the frame. That is, in some examples, the steel-diaphragm may be against the frame and sound The bottom layer may be from about ⅜ inches thick to about ½ inch thick. In some examples, the bottom layer may be implemented using SURE-BOARD e.g., as available from CEMCO. The top layer may also include non-combustible material such as cement board, fiber cement board, gypsum board, or the like. In some examples, the top layer may be implemented using HARDIEBACKER 500 cement board, as available from James Hardie Building Products. The top layer may be about ½ inch thick. The radiant heating layer may be implemented using a substrate of insulating material (e.g., high density polystyrene foam) which defines a channel for a hydronic or electric radiant heating element. A thermally conductive sheet (e.g., 24 gage aluminum sheet) may be bonded to the insulating material on the channel side of the substrate. The radiant heating element may be hydronic and may be implemented in the form of PEX tubing. The radiant heating element may be provided in the channel substantially within the depth of the radiant heating layer to provide low profile radiant heating panel. The radiant heating layer may be about 1 inch thick. In some examples, the radiant heating layer may be implemented using components of the ROTH radiant heating panel system. Sound insulation material may be provided between the frame and the ceiling and/or floor panels.

Example 3

In another non-limiting example, a floor and ceiling panel may include a frame, a floor panel, and a ceiling panel. The frame may be made of metal, such as aluminum or construction grade steel. Alternatively the frame may be made of plastics, composites, or wood. The panel frame may include five joists spaced at about 12 inch on center to define a panel frame having an overall length of about 24 feet and overall width of about 4 feet. In other examples, the joists may be spaced at up to two foot on center along the length of the end members.

The ceiling panel may include at least one layer of non-combustible material such as cement board, for example HARDIEBACKER 500 MgO cement board available from James Hardie Building Products. The non-combustible material may be attached to the frame using conventional fasteners (e.g., threaded fasteners), adhesives, or other known techniques. In some examples, the ceiling panel may be formed of a plurality of individual boards of cement board, which may be arranged continuously to cover or substantially cover the ceiling side of the floor and ceiling panel. In some examples, the ceiling panel may include two or more layers of non-combustible material such as cement board. Individual boards of cement board on adjacent layers may be staggered to avoid alignment or overlapping of seams between the boards. In some examples, the ceiling may be formed using fiber board, such as non-combustible, structural fiber cement board manufactured by US Architectural Products (marketed under the name Plycem® CemDeck™).

The floor panel may include a plurality of layers including a bottom layer and a top layer, one or both of which may be made from non-combustible material, and a radiant heating layer between the bottom and top layers. In some examples, the bottom layer may include a non-combustible material such as cement board, fiber cement board, gypsum board, or the like. In some examples, the bottom layer may be implemented using SURE-BOARD. The top layer may also include non-combustible material such as cement board, fiber cement board, gypsum board, or the like. In some examples, the top layer may be implemented using HARDIEBACKER 500 cement board. The radiant heating layer may be implemented using ROTH radiant heating panels and electrical radiant heating element. Sound insulation material may be provided between the frame and the ceiling and/or floor panels. In some example, sound insulation material may be provided between layers of the ceiling and/or floor panels. In one embodiment, sound insulation in the form of sound insulation strips may be provided between mating surfaces of joists and the ceiling and/or floor panels. In some examples, a sound insulation pad may be provided between the radiant heating layer and the bottom layer of the floor panel. It will be understood that the components of the floor-ceiling panels and building structures described herein may be practices in other combinations than the specific examples described herein.

Figure 8:
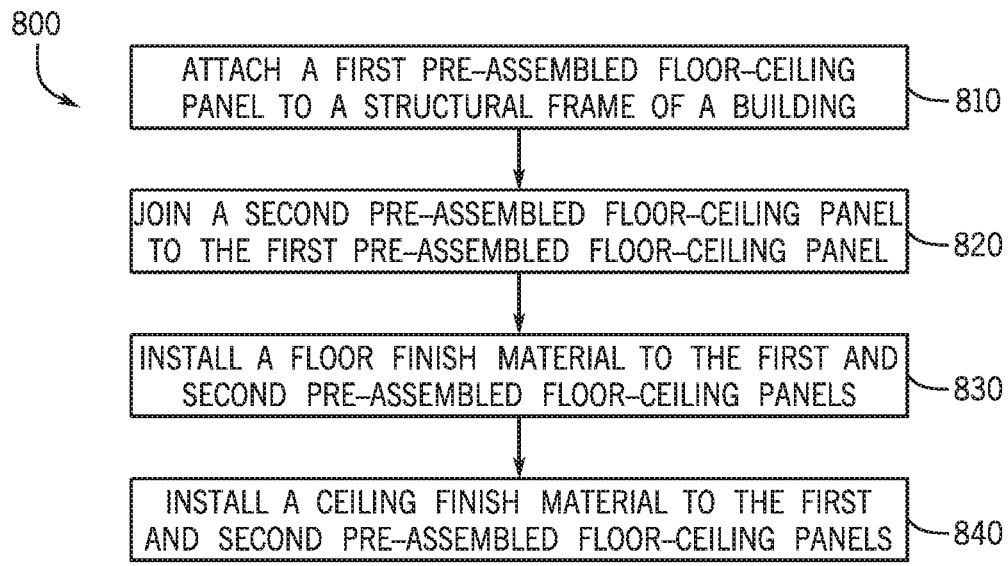
FIG. 8 is a flowchart of an example method of constructing a floor system for a building.
Figure 9:
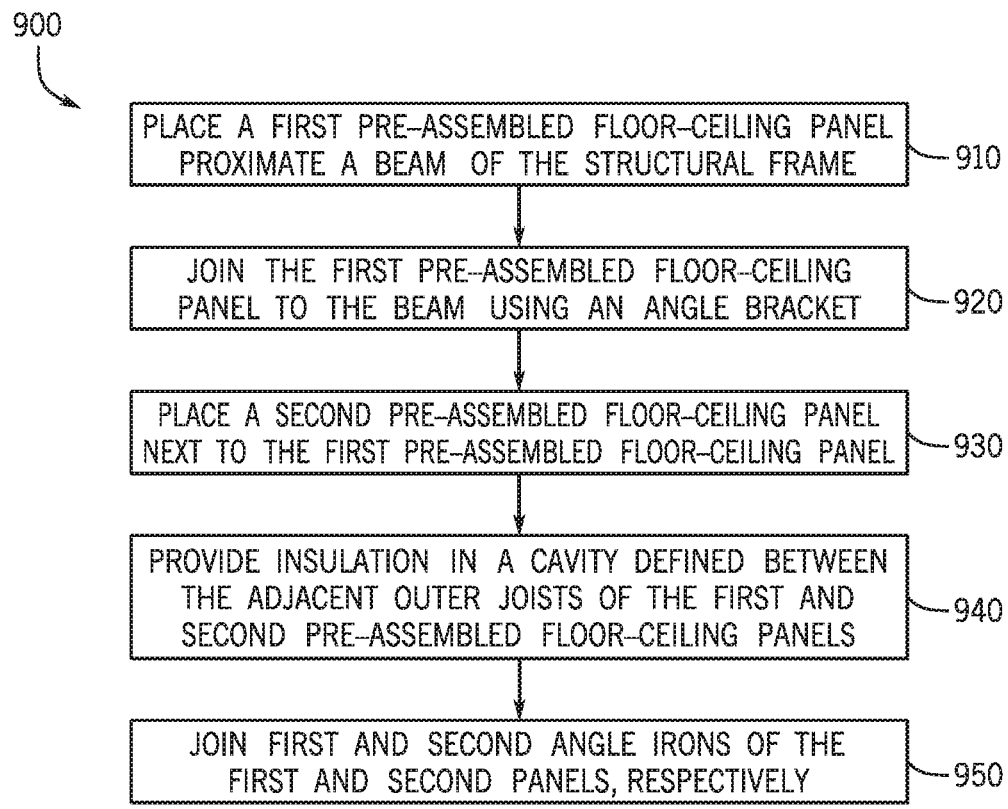
FIG. 9 is a flowchart of another example method of constructing a floor system for a building.
Figure 10:
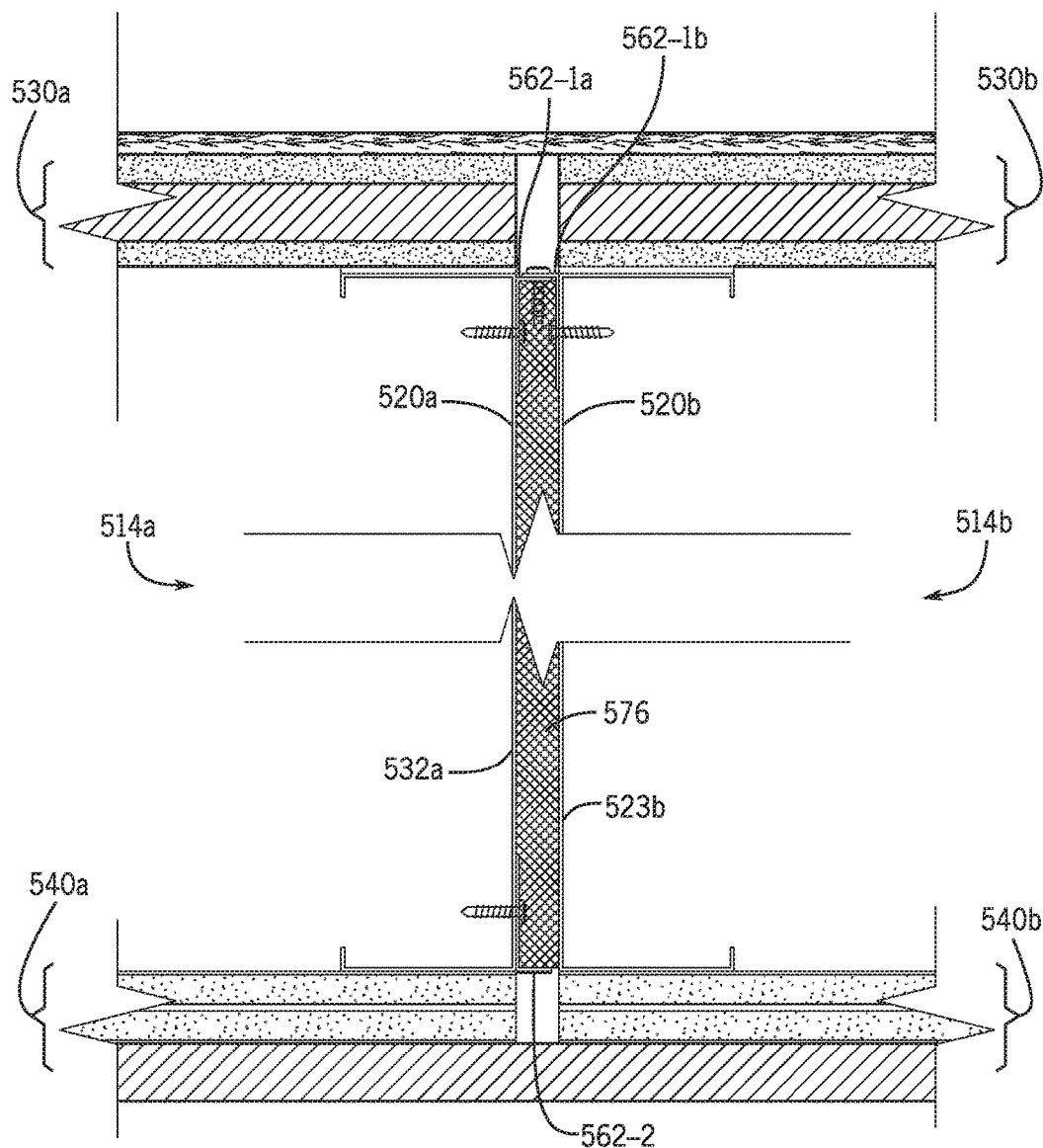
FIG. 10 is a partial elevation cross-sectional view of a joint between adjacent floor and ceiling panels.
Figure 11:
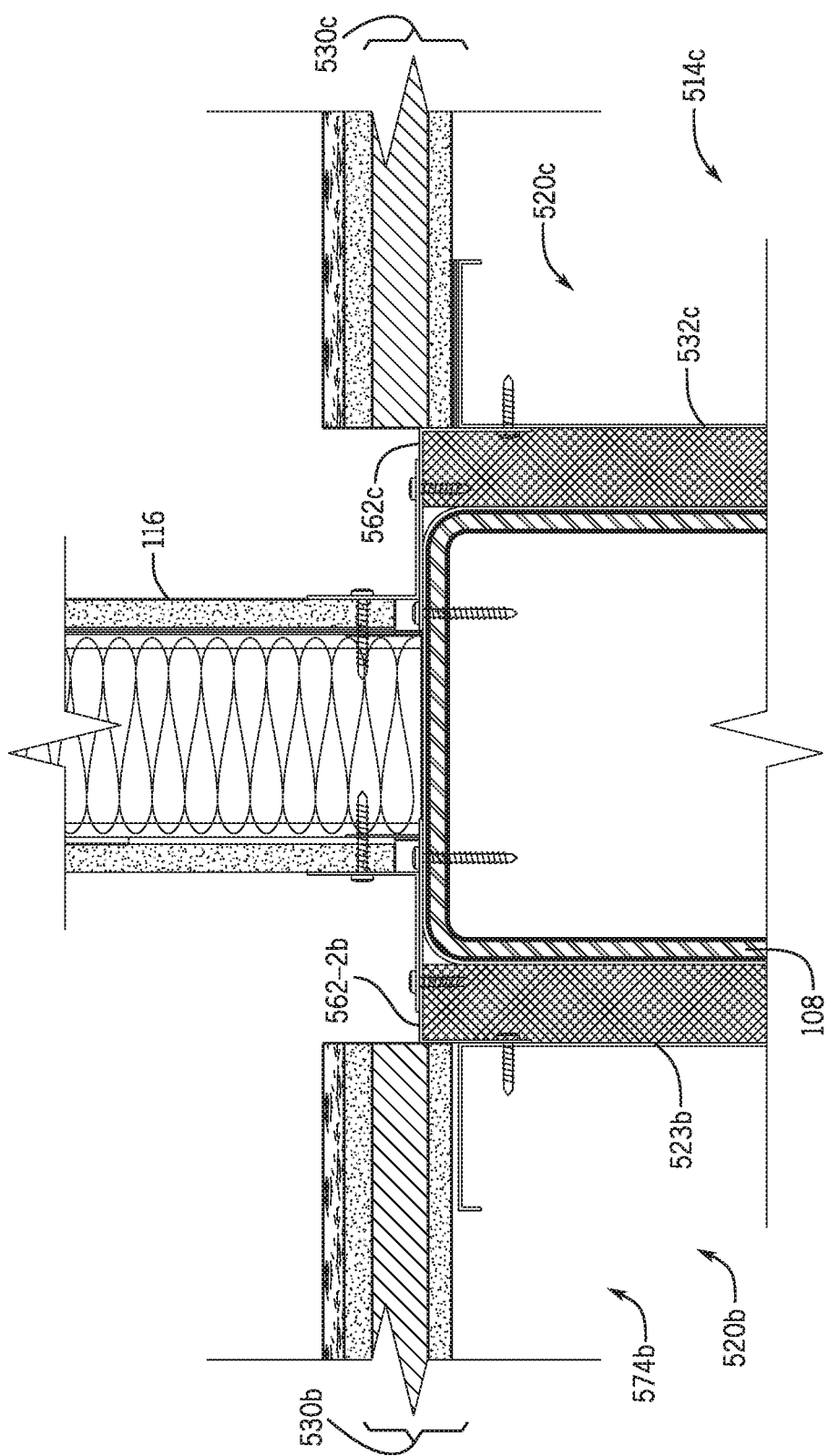
FIG. 11 is a partial elevation cross-sectional view of a joint between a floor and ceiling panel and a structural frame of a building.

FIGS. 8 and 9 are flow diagrams of example methods in accordance with the present disclosure. The methods 800 and 900 may be used to construct a floor system for a building, such as building 102. An example method may include one or more operations, functions or actions as illustrated by one or more of blocks 810-840, and blocks 910-960. With reference also to FIGS. 10 and 11, operations of the example methods will now be described. FIG. 10 shows a joint between adjacent floor-ceiling panels (e.g., floor-ceiling panels 514*a* and 514*b*), each of which includes a panel frame 520*a*, 520*b*, floor panels 530*a*, 530*b*, and ceiling panels 540*a*, 540*b*, respectively. FIG. 10 shows outer joist 523*a* and angle members 562-1*a* and 562-2*a* of the floor-ceiling panel 514*a* and outer joist 532*b* and angle members 562-1*b* and 562-2*b* of the floor-ceiling panel 514*b*. FIG. 11 shows a two floor-ceiling panels (e.g., floor-ceiling panels 514*b* and 514*c*), each of which includes a panel frame 520*a*, 520*b*, floor panels 530*a*, 530*b*, respectively, and ceiling panels (not shown). FIG. 11 further shows panel 514*b* joined to beam 108 using angle member 562-2*b* and a wall 116 positioned over the beam 108. The various components shown in FIGS. 10 and 11 are merely illustrative, and other variations, including eliminating components, combining components, and substituting components are all contemplated.

An example method 800 may include attaching a first pre-assembled floor-ceiling panel (e.g., floor-ceiling panel 114, 214, 514) to a structural frame of a building, as shown in block 810. The method 800 may include joining a second pre-assembled floor-ceiling panel e.g., floor-ceiling panel 114, 214, 514) to the first pre-assembled floor-ceiling panel, as shown in block 820. Each of the first and second pre-assembled floor-ceiling panels may include a plurality of joists, a ceiling panel disposed below and attached to the plurality of joists, and a floor panel disposed above and attached to the plurality of joists. The floor panel of each of the first and second pre-assembled floor-ceiling panels may include a first floor layer disposed above and attached to the frame, a second floor layer over and spaced from the first floor layer, and a shaped substrate provided between the first and second floor layers, the shaped substrate including a channel and an in-floor radiant heat element received in the channel. The method may further include installing a floor finish material to the first and second pre-assembled floor-ceiling panels, as shown in block 830, and installing a ceiling finish material (e.g., acoustical ceiling panels) to the first and second pre-assembled floor-ceiling panels, as shown in block 840. In some examples the installing of a floor finish material may include covering a seam between adjacent floor-ceiling panels. For example, the installing of a floor finish material may include attaching a floor finish (e.g., hardwood, tile, laminate) material to the pre-assembled floor-ceiling panels such that the floor finish material extends over a seam between the first and second floor-ceiling panels. In some examples, the installing of a ceiling finish material may similarly include installation of a ceiling finish material across a seam between adjacent floor-ceiling panels.

An example method 900 may include placing the first pre-assembled floor-ceiling panel (e.g., floor-ceiling panel 514*b* in FIG. 11) proximate a beam of the structural frame, as shown in block 910. As shown in block 920, the method 900 may further include joining the first pre-assembled panel to the beam using a mounting component (e.g., angle member 562-2*b*). In some examples, the floor-ceiling panel may be joined to the frame using an angle bracket, which may be arranged vertically with respect to the pre-assembled floor-ceiling panel and the beam. As shown in block 930, the method 900 may further include placing a second pre-assembled floor-ceiling panel next to the first pre-assembled floor-ceiling panel (e.g., floor-ceiling panel 514*a* in FIG. 10) such as by placing the two floor-ceiling panels side to side so that an outer joist (e.g., 523*b*) of the first pre-assembled floor-ceiling panels is adjacent and spaced from an outer joist (e.g., 523*a*) of the second pre-assembled floor-ceiling panel. The method 900 may include providing insulation (e.g., 576) in a cavity defined between the adjacent outer joists of the first and second pre-assembled floor-ceiling panels, as shown in block 940. The method 900 may further include joining a first angle member (e.g., 562-1*b*) of the first pre-assembled floor-ceiling panel to an angle member (e.g., 562-1*a*) of the second pre-assembled floor-ceiling panel to attach the second pre-assembled panel to the first pre-assembled panel, as shown in block 950. The angle members may be joined using fasteners. In some examples, attaching the first pre-assembled floor-ceiling panel to the structural frame may be performed before joining the second pre-assembled floor-ceiling panel to the first pre-assembled floor-ceiling panel.

Referring back to FIGS. 1 and 2, a building (e.g., building 102) may include at least five stories. The building may include a structural frame 104. The structural frame may include vertical structural members (e.g., columns 106) and horizontal structural members (e.g., beams 108). The walls 116 of the building may be implemented using pre-assembled wall panels that extend the full distance between adjacent columns 106. The walls 116 may be non-load bearing walls and may be arranged over or proximate beams that connect adjacent columns such that substantially all loads may be carried by the structural frame 104 and/or eliminate or minimize the use of cross-braces. The floor system of the building may be constructed using a plurality of pre-assembled floor-ceiling panels (e.g., floor-ceiling panel 114) in accordance with the present disclosure.

The floor-ceiling panels 114 may be disposed between two vertically adjacent stories (e.g., stories 103*a*, 103*b*). Each of the floor-ceiling panels 114 may include a ceiling panel on a ceiling side, which defines a ceiling of one of the two vertically adjacent stories (e.g., story 103*a*) and a floor panel on a floor side, which defines the floor of the other one of the vertically adjacent stories (e.g., story 103*b*). The floor-ceiling panels may be implemented using any of the examples herein (e.g., 214, 514). The floor panel and the ceiling panels of the floor-ceiling panel may be attached to a panel frame which is disposed between and supports the floor and the ceiling panels. The panel frame may include a plurality of joists extending between opposing end members. The joists may span substantially the full length of a unit (e.g., 112a, 112b). When the pre-assembled floor-ceiling panels 114 are installed in building 102, the end members may align with and be proximate two opposing beams (108a 108b) and the joists may span substantially the full distance between the opposing beams.

The floor-ceiling panels 114 may include mounting components for attaching adjacent floor-ceiling panels 114 to one another and/or joining the floor-ceiling panels 114 to the structural frame 104. For example, the floor-ceiling panels 114 may include first mounting components for attaching the panels to the structural frame. The first mounting components may be attached to the end members (e.g., along the transverse direction) of the panels. The first mounting components may be configured to transfer diaphragm loads to the structural frame. In some examples, the first mounting components may be implemented in the form of vertically arranged angle brackets. By vertically arranged, it is generally implied that a longitudinal direction of a bracket is generally aligned with a vertical direction (e.g., depth direction) of the panel.

The floor-ceiling panels 114 may include second mounting components for attaching adjacent floor-ceiling panels to one another. The second mounting components may be arranged primarily along a longitudinal direction (e.g., span direction) of the floor-ceiling panels 114. The second mounting components may include angle members or angle brackets which extend longitudinally along a floor-ceiling panel 114. That is, a longitudinal direction of an angle member or angle bracket is generally aligned with a longitudinal (e.g., span direction) of a floor-ceiling panel. As will be appreciated by those of skill in the art, an angle member or angle bracket may have a generally L-shaped cross section defined by two sides of the angle. One of the sides may be connected to the panel frame (e.g., to an outer joist) and the other side may extend from the frame for attaching to another floor-ceiling panel. The angle members or angle brackets may extend continuously along the full or substantially full length of a panel. In some examples, the second mounting components may be implanted using a plurality of separate angle brackets attached along the length of an outer joist at regular or irregular spacing along the length.

As will be appreciated, one or more of the stories of building 102 may be divided into units and the floor of each unit may be defined by a small number of pre-assembled panels, for example two panels, three panels, four panels, or five panels. In some examples, a different number of panels may be used to construct the floor of each unit. When the panels are installed in a building, the second mounting components may connect adjacent panels and the first mounting components may connect the panels to the frame (e.g., to a beam 108).

Figure 12:
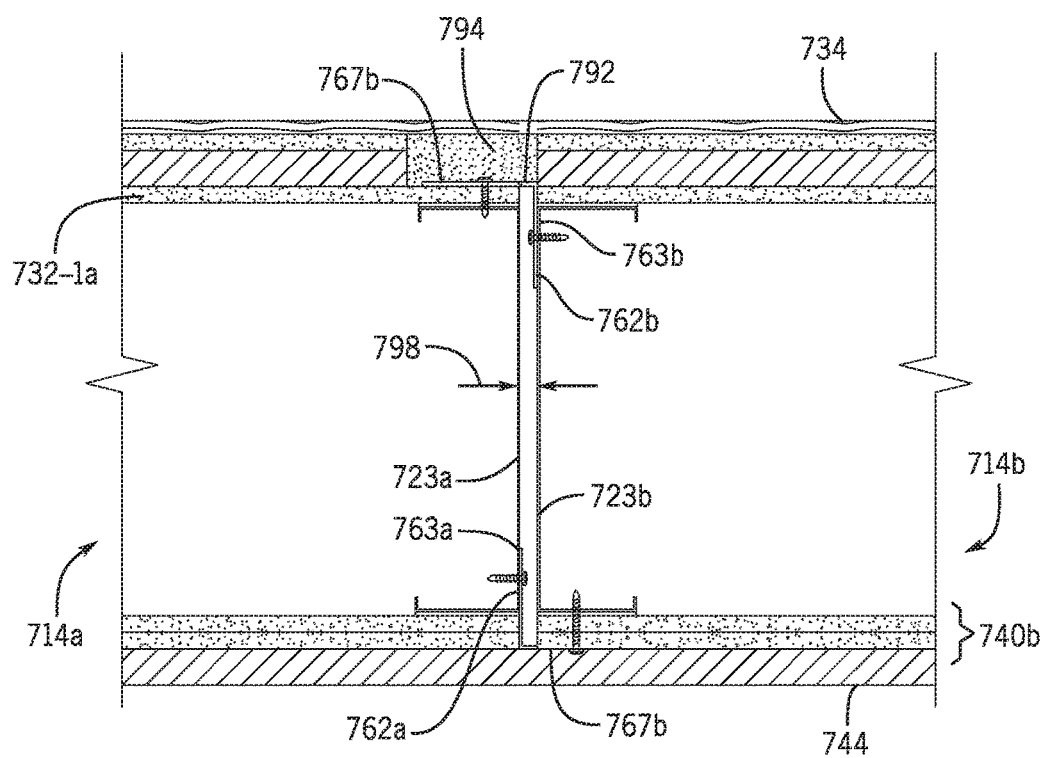
FIG. 12 is another partial elevation cross-sectional view of a joint between adjacent floor and ceiling panels.

FIG. 12 shows a joint between adjacent floor-ceiling panels in accordance with further examples herein. The two adjacent floor-ceiling panels 714a and 714b are joined to one another using angle members 762a and 762b. The floor-ceiling panels 714a and 714b are positioned side by side (e.g., with outer joist 723a of one floor-ceiling panels proximate outer joist 723b of the other floor-ceiling panels). A narrow gap 798 (e.g., up to about ½ inch, or more in other examples) may be defined between the outer joists 723a and 723b when the floor-ceiling panels 714a and 714b are joined, such as to accommodate the thickness of the angle members 762a, 762b, fasteners, weld joints, or the like, between the adjoining panels. In some examples, insulation may be provided in the gap. In some examples, the outer joists 723a and 723b may substantially abut one another after the floor-ceiling panels 714a, 714b have been joined.

As described, each of the floor-ceiling panels 714a, 714b may include one or more angle members for attaching adjacent panels to one another. In some examples, the angle members may be formed of 18 gage structural grade steel. In some examples, the angle members may be formed from other metals, such as aluminum or different gages or grades of steel, or a non-metallic material, such as a fiber reinforced composite material. Panel 714a may include an angle member 762a which may be attached to the outer joist 723a using a threaded fastener or other conventional means (e.g., rivets, welding, adhesives). Panel 714b may include an angle member 762b which may be attached to the outer joist 723a similarly using a threaded fastener or other conventional means (e.g., rivets, welding, adhesives). The angle members 762a and 762b may be implemented in the form of continuous members extending substantially along the full length of the panels. In some examples, angle members 762a and 762b may be implemented using a plurality of shorter individual angle brackets attached along the length of one or more of the outer joists. The angle members 762a and 762b may have generally L-shaped cross-sections defined by vertical portions 763a, 763b and horizontal portions 767a, 767b. The vertical portions 763a, 763b abut respective ones of the joists 723a, 723b and are attached thereto. The horizontal portions 767a, 767b extend generally perpendicularly outward from the joists 723a, 723b. In some examples, the horizontal portions 767a, 767b may extend up to about 3 inches from the joists 723a, 723b.

The angle member 762a may be attached proximate the lower or ceiling side of the floor-ceiling panels 714a with the horizontal portion 767a generally in plane with the bottom surface of the ceiling panel 740b. The bottom of ceiling panel 740b rests against the horizontal portion 767a forming a lower lap joint between the adjoining floor-ceiling panels 714a and 714b. The horizontal portion 767a may be attached to the floor-ceiling panel 714b using fasteners, which may extend through the ceiling panel 740b and the flange of joist 723b. The angle member 762b may be attached proximate the upper or floor side of the floor-ceiling panel 714b with the horizontal portion 767b generally in plane with the top surface of the substrate 732-1a. The horizontal portion 767b rests onto the top surface of the substrate 732-1a forming an upper lap joint between the floor-ceiling panels 714a and 714b. The horizontal portion 767b may be attached to the floor-ceiling panels 714a using a fastener, which may extend through the substrate 732-1a and the flange of joist 723a. Finish materials (e.g., ceiling finish 744 and floor finish 734) may extend over the lap joints to conceal the seams between adjoining floor-ceiling panels. Fire resistant material (e.g., fire tape 792) may be provided over the horizontal portions 767a, 767b across the gap 798. Filler 794 may be provided below the floor finish 734, and the filler 794 and/or floor finish 734 may extend over the seam at the upper lap joint.

The examples provided are for explanatory purposes only and should not be considered to limit the scope of the disclosure. Embodiments of pre-assembled floor and ceiling panels described herein, including the pre-assembled floor and ceiling panel 114, may provide a floor and ceiling system useable in low-rise, mid-rise, and high-rise residential projects, among others. The panels may be configured to comply with one or more of the following building codes: fire, energy, handicap, life-safety, and acoustical (impact and ambient noise transfer). In some embodiments, the pre-assembled floor and ceiling panels may be considered as a fully-integrated sub-assembly meeting fire, sound impact, energy, and life/safety codes. The floor and ceiling panels may be fully integrated with electrical, fire protection, energy insulation, and sound isolation capabilities in some embodiments. The floor and ceiling panels may be designed to achieve a fire rating set by the applicable building code, such as a two-hour fire rating. In some embodiments, the panels may provide a heating system for the building units, such as the units 112 in FIG. 1.

The floor and ceiling panels described herein may be fabricated off-site in a factory or shop and transported to the project site (also referred to as job site) for attachment to a structural frame, such as a structural exoskeleton, of a building. The panels may be fabricated in various sizes. For example, a panel according to the present disclosure may have a width of about four feet to about 8 feet and a length of about 20 feet or more (e.g., 22 feet, 24 feet, 26 feet). These width and length dimensions may generally exclude components that extend beyond the perimeter of the panel, e.g., as may be used to join adjacent panels and/or join the panels to the structural frame. That is, in some examples, an overall length of the panels may exceed 8 feet in width and 24 feet in length although the panel may be referred to as an 8 by 24 foot panel. Generally, any size panels, including larger panels and smaller infill panels than the examples above may be fabricated on a project-by-project need to complete the building floor system. At the building site, the panel may be attached to end walls, demising walls, utility walls, building utilities, or any combination thereof.

The floor and ceiling panel may function as the floor of at least one unit of the building, in that a floor finish may be applied directly over the floor panel. The floor and ceiling panel may function as the ceiling of at least one unit of the building, in that a ceiling finish may be applied directly over the ceiling panel. In some examples, the floor and ceiling finishes may be applied at the factory. In some examples, the floor and/or ceiling finishes may be removably connected to the floor and ceiling panel to enable temporary removal at the job site (e.g., for joining adjacent floor and ceiling panels and/or attaching the floor and ceiling panels to the building's structural frame).

In some examples, a floor and ceiling panel may include one or more boards, each board comprising an inorganic material, such as an inorganic mineral material, such as gypsum. A board may be a fiberglass-clad board, and/or comprise glass or other fibers within the board. A board may be a fireproof board. In some examples the board may be a waterproof or substantially waterproof board. In some examples, a floor and ceiling panel may further include a metal sheet such as a sheet of steel, aluminum (for example, aluminum alloy) or other metal. In some examples, the metal sheet may function as a diaphragm and may interchangeably be referred to as metal diaphragm.

The present disclosure is not to be limited in terms of the particular embodiments described in this application, which are intended as illustrations of various aspects. Many modifications and embodiments can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and embodiments are intended to fall within the scope of the appended claims. The present disclosure includes the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various embodiments of the devices and/or processes via the use of block diagrams, flowcharts, and/or embodiments, such block diagrams, flowcharts, and/or embodiments contain one or more functions and/or operations, it will be understood by those within the art that each function and/or operation within such block diagrams, flowcharts, or embodiments can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A pre-assembled floor-ceiling panel, comprising:
    a panel frame comprising a plurality of spaced apart joists disposed between and connected to first and second opposing end members;
    a ceiling panel disposed below and attached to the panel frame, wherein the ceiling panel comprises at least one pre-fabricated board of non-combustible material;
    a floor panel disposed over and attached to the panel frame, wherein the floor panel comprises a plurality of stacked layers that include:
        a first layer disposed above and attached to the panel frame;
        a second layer disposed above and spaced apart from the first layer, wherein the first layer, the second layer, or both comprise one or more pre-fabricated boards of non-combustible material; and
        a shaped substrate between the first and second layers, wherein the shaped substrate comprises a radiant heat member in a channel defined by an upper surface of the shaped substrate; and
    a mounting component attached to the panel frame, wherein:
        the mounting component is configured to join the floor-ceiling panel to a structural frame of a building, and
        the mounting component includes at least one bracket arranged vertically with respect to a horizontal member of the structural frame of the building.

2. The floor-ceiling panel of claim 1, further comprising another mounting component attached to the panel frame, wherein the another mounting component is configured to join adjacent floor-ceiling panels.

3. The floor-ceiling panel of claim 2, wherein the another mounting component includes a first angle member that extends, at least partially, along a length of the panel frame.

4. The floor-ceiling panel of claim 1, wherein the plurality of spaced apart joists comprises first and second outer joists and at least one inner joist disposed between the first and second outer joists.

5. The floor-ceiling panel of claim 4, further comprising a first angle member that is attached to one of the first and second outer joists and that extends along a length of the one of the first and second outer joists.

6. The floor-ceiling panel of claim 5, further comprising a second angle member attached to a same joist as the first angle member, wherein the second angle member is parallel to the first angle member.

7. The floor-ceiling panel of claim 5, further comprising another angle member attached to the other one of the first and second outer joists, wherein the other angle member is parallel to the first angle member.

8. The floor-ceiling panel of claim 4, wherein the mounting component is attached to at least one of the first and second outer joists and/or at least one of the first and second opposing end members.

9. The floor-ceiling panel of claim 1, wherein the plurality of spaced apart joists comprises metal joists that have a C-shaped cross-section.

10. The floor-ceiling panel of claim 1, wherein:
    the ceiling panel comprises two stacked layers of fiberglass-clad gypsum boards, and/or
    the first layer comprises a metal-clad cement board, and/or
    the second layer comprises magnesium oxide board.

11. The floor-ceiling panel of claim 10, wherein individual boards of the two stacked layers are staggered such that seams between boards of one of the two stacked layers are offset from seams between boards of the other of the two stacked layers.

12. The floor-ceiling panel of claim 1, wherein the first layer comprises a metal-clad cement board, and wherein a metal side of the first layer is disposed against the panel frame.

13. The floor-ceiling panel of claim 1, wherein the shaped substrate comprises an insulative core and a metal sheet bonded to the upper surface, and wherein the metal sheet follows contours of the channel defined by the upper surface.

14. The floor-ceiling panel of claim 1, wherein the first layer is longer in length than the second layer, the shaped substrate, or both.

15. The floor-ceiling panel of claim 14, wherein the first layer is longer in width than the second layer and the shaped substrate.

16. The floor-ceiling panel of claim 1, wherein the floor-ceiling panel is configured to accommodate a pre-assembled wall structure along a perimeter portion of the floor-ceiling panel.

17. The floor-ceiling panel of claim 16, wherein the shaped substrate and the second layer are shorter than the first substrate to define a ledge to support the pre-assembled wall panel.

18. The floor-ceiling panel of claim 1, wherein the ceiling panel and at least one of the plurality of stacked layers of the floor panel extend a full length of the plurality of spaced apart joists.

19. The floor-ceiling panel of claim 1, further comprising thermally insulative material between the floor and ceiling panels.

20. The floor-ceiling panel of claim 1, further comprising sound insulative material between the panel frame and each of the floor and ceiling panels.

21. The floor-ceiling panel of claim 20, wherein the sound insulative material comprises a plurality of sound strips that line flanges of the plurality of spaced apart joists.

22. The floor-ceiling panel of claim 1, further comprising a shower pan integrated into the floor panel.

23. The floor-ceiling panel of claim 1, wherein the mounting component is attached to at least one of the plurality of spaced apart joists and/or at least one of the first and second opposing end members.

24. A building including that includes at least five stories, the building comprising:
a structural frame that includes a horizontal beam; and
a pre-assembled floor-ceiling panel disposed between two vertically adjacent stories of the building, wherein the floor-ceiling panel comprises:
  a ceiling panel provided on a ceiling side of the floor-ceiling panel and that defines a ceiling of one of the two vertically adjacent stories;
  a floor panel provided on a floor side of the floor-ceiling panel and that defines a floor of the other one of the two vertically adjacent stories;
  a panel frame disposed between and supporting the floor and ceiling panels, wherein the panel frame comprises a plurality of joists which span a full length of a unit of the building; and
  a mounting component joined to the panel frame and that connects the pre-assembled floor-ceiling panel to the horizontal beam, wherein the mounting component includes at least one bracket arranged vertically with respect to the horizontal beam of the structural frame of the building.

25. The building of claim 24, further comprising a particular unit on one of the two vertically adjacent stories, wherein the particular unit comprises a floor defined by three or fewer pre-assembled floor-ceiling panels.

26. The building of claim 25, wherein the particular unit further comprises two opposing walls spaced by a distance, and wherein each of the three or fewer pre-assembled floor-ceiling panels spans the distance between the two opposing walls.

27. The building of claim 24, wherein the pre-assembled floor-ceiling panel comprises at least one of: a radiant heat element provided within a depth of the floor panel, or a shower pan integrated into the floor panel.

28. The building of claim 24, further comprising another mounting component along a longitudinal direction of the pre-assembled floor-ceiling panel, wherein the another mounting component joins adjacent floor-ceiling panels.

29. The building of claim 24, wherein the mounting component is attached to at least one of the plurality of joists.

30. The building of claim 24, wherein the plurality of joists includes one or more inner joists and one or more outer joists, and wherein the mounting component is attached to at least one of the one or more outer joists.

31. A method to construct a floor system for a building, the method comprising:
attaching a first pre-assembled floor-ceiling panel to a structural frame of a building, wherein attaching the first pre-assembled panel to the structural frame of the building comprises:
  placing the first pre-assembled floor-ceiling panel proximate a beam of the structural frame; and
  joining the first pre-assembled floor-ceiling panel to the beam using an angle bracket comprised as part of the first pre-assembled floor-ceiling panel and arranged vertically with respect to the first pre-assembled floor-ceiling panel and the beam of the structural frame;
joining a second pre-assembled floor-ceiling panel to the first pre-assembled floor-ceiling panel, wherein each of the first and second pre-assembled floor-ceiling panels comprises a plurality of joists, a ceiling panel disposed below and attached to the plurality of joists, and a floor panel disposed above and attached to the plurality of joists, wherein the floor panel comprises a first floor layer disposed above and attached to a frame of the floor-ceiling panel, a second floor layer over and spaced from the first floor layer, and a shaped substrate provided between the first and second floor layers, and wherein the shaped substrate comprises a channel, and an in-floor radiant heat element received in the channel; and
installing a floor finish material to the first and second pre-assembled floor-ceiling panels.

32. The method of claim 31, wherein attaching the first pre-assembled floor-ceiling panel to the structural frame is performed before the joining the second pre-assembled floor-ceiling panel to the first pre-assembled floor-ceiling panel.

33. The method of claim 31, wherein joining the second pre-assembled floor-ceiling panel to the first pre-assembled floor-ceiling panel comprises:
placing the second pre-assembled floor-ceiling panel next to the first pre-assembled floor-ceiling panel such that an outer joist of the first pre-assembled floor-ceiling panel is adjacent and spaced from an outer joist of the second pre-assembled floor-ceiling panel; and
joining a first angle member of the first pre-assembled floor-ceiling panel to a second angle member of the second pre-assembled floor-ceiling panel to attach the second pre-assembled panel to the first pre-assembled panel.

34. The method of claim 33, further comprising providing insulation in a cavity defined between the adjacent outer joists of the first and second pre-assembled floor-ceiling panels.

35. The method of claim 33, wherein installing the floor finish material comprises attaching the floor finish material to the first and second pre-assembled floor-ceiling panels such that the floor finish material extends over a seam between the first and second pre-assembled floor-ceiling panels.

36. The method of claim 31, further comprising installing a ceiling finish material to the first and second pre-assembled floor-ceiling panels such that the ceiling finish material extends over a seam between the first and second pre-assembled floor-ceiling panels.

37. The method of claim 31, wherein the first pre-assembled floor-ceiling panel comprises a plurality of joists, and wherein the angle bracket is attached to at least one of the plurality of joists.

38. The method of claim 37, wherein the plurality of joists includes one or more inner joists and one or more outer joists, and wherein the angle bracket is attached to at least one of the one or more outer joists.

* * * * *